US012748563B2

(12) United States Patent
Phillips

(10) Patent No.: US 12,748,563 B2
(45) Date of Patent: Sep. 29, 2026

(54) FIELD OF VISION AUDIO CONTROL FOR PHYSICAL OR MIX OF PHYSICAL AND EXTENDED REALITY MEDIA DISPLAYS IN A SPATIALLY MAPPED SPACE

(71) Applicant: Adeia Guides Inc., San Jose, CA (US)

(72) Inventor: Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 116 days.

(21) Appl. No.: 17/949,842

(22) Filed: Sep. 21, 2022

(65) Prior Publication Data

US 2024/0094977 A1 Mar. 21, 2024

(51) Int. Cl.
*G06F 3/16* (2006.01)
*G06F 3/01* (2006.01)

(52) U.S. Cl.
CPC .............. *G06F 3/165* (2013.01); *G06F 3/012* (2013.01); *G06F 3/013* (2013.01)

(58) Field of Classification Search
CPC ............. H04S 2400/01; H04S 2400/13; H04S 2420/07; H04S 7/303; H04S 7/307; H04S 7/308; H04L 65/403; H04L 65/70; H04L 65/762; H04L 65/80; H04L 12/1822; H04L 12/1827; H04L 67/12; H04L 51/04; H04L 63/104; H04L 63/105; H04L 67/08; H04L 12/1831; H04L 12/1895; H04L 12/2803; H04L 12/282; H04L 12/4625; H04L 2012/285; H04L 65/1089; H04L 67/75; H04L 69/329; G10L 15/22; G10L 15/26; H04M 1/0216; H04M 1/0243; H04M 1/6008; H04M 1/72454; H04M 2250/52; H04M 3/567; H04W 76/10; H04W 4/38; G06F 3/013; G06F 3/011; G06F 3/017; G06F 3/012; G06F 3/165; G06F 3/04815; G06F 3/167; G06F 3/04842;

(Continued)

(56) References Cited

U.S. PATENT DOCUMENTS 8,854,447 B2 10/2014 Conness et al.
8,922,480 B1 12/2014 Freed et al.

(Continued)

OTHER PUBLICATIONS

AT&T and Magic Leap will let you watch 4 shows at a time, Ben Munson, Oct. 10 2018. https://www.fiercevideo.com/tech/at-t-and-magic-leap-will-let-you-watch-four-shows-at-time.

*Primary Examiner* — Lun-See Lao
(74) *Attorney, Agent, or Firm* — HG LAW LLP

(57) ABSTRACT

Systems and methods for controlling the volume of content displayed on displays, such as physical and extended reality displays, based on the pose of an extended reality (XR) headset, or the gaze therefrom, are disclosed. The methods spatially map displays and audio devices on which the content is to be outputted. The methods also monitor 6DOF of the XR headset worn by the user to consume the displayed content. Based on a user's current pose or gaze, the methods determine a field of view (FOV) from the XR headset and the displays that fall within the FOV. The volume of the displays is controlled based on the where the display is located relative to the pose or gaze. The volume of a display that is within a threshold angle of the gaze is increased and volume of other displays is minimized, muted, and/or the content is displayed as closed captioning.

22 Claims, 17 Drawing Sheets

| Range # | Angle | Volume level |
|---|---|---|
| 1 | 0° to 45° | A |
| 2 | 46° to 70° | B |
| 3 | 71° to 90° | C |
| 4 | 91° to 270° | D |

(58) Field of Classification Search
CPC ...... G06F 3/0304; G06F 1/163; G06F 3/0482; G06F 2203/0381; G06F 3/016; G06F 3/04845; G06F 3/04847; G06F 1/1686; G06F 3/0346; G06F 21/32; G06F 21/34; G06F 3/0362; G06F 3/0487; G06F 3/04883; G06F 3/0481; G06F 1/1626; G06F 3/014; G06F 3/0488; G06F 3/16; G06F 1/1671; G06F 1/169; G06F 16/954; G06F 2203/04806; G06F 3/03547; G06F 3/0485; G06F 1/1605; G06F 2200/1637; G06F 3/0236; G06F 3/038; G06F 3/0484; G06F 3/0486; G06F 3/14; G06F 40/30
USPC ...................................... 381/104–108; 700/94
See application file for complete search history.

(56) References Cited

U.S. PATENT DOCUMENTS

| | | | | |
|---|---|---|---|---|
| 9,100,464 | B2 | 8/2015 | Dasher et al. | |
| 2012/0163625 | A1 | 6/2012 | Siotis et al. | |
| 2012/0293406 | A1* | 11/2012 | Park | G06F 3/0485 345/156 |
| 2013/0135196 | A1 | 5/2013 | Park et al. | |
| 2014/0176813 | A1* | 6/2014 | Conness | H04N 21/42204 348/738 |
| 2014/0375558 | A1 | 12/2014 | Conness et al. | |
| 2017/0048613 | A1* | 2/2017 | Smus | H04L 65/1069 |
| 2018/0070113 | A1 | 3/2018 | Phillips et al. | |
| 2018/0329672 | A1* | 11/2018 | Sadak | G06F 1/1649 |
| 2021/0185471 | A1* | 6/2021 | Jot | G02B 27/0093 |
| 2022/0159396 | A1* | 5/2022 | Fryer | H04R 1/345 |
| 2023/0106627 | A1* | 4/2023 | Dascola | G06F 3/012 345/419 |

* cited by examiner

| Range # | Angle | Volume level |
|---|---|---|
| 1 | $0^0$ to $45^0$ | A |
| 2 | $46^0$ to $70^0$ | B |
| 3 | $71^0$ to $90^0$ | C |
| 4 | $91^0$ to $270^0$ | D |

FIELD OF VISION AUDIO CONTROL FOR PHYSICAL OR MIX OF PHYSICAL AND EXTENDED REALITY MEDIA DISPLAYS IN A SPATIALLY MAPPED SPACE

FIELD OF INVENTION

Embodiments of the present disclosure relate to controlling audio output of a physical or a mix of physical and extended reality display via an extended reality device based on movements and orientations of the extended reality device in the spatially mapped room.

BACKGROUND

Current broadcasts by different sources often show several shows or games that may be of interest to the user at the same time. This may be especially true in a tournament or sports series-style broadcast, such as NBA™ playoffs, NFL™ Sundays, FIFA™ World Cup, Cricket World Cup, college sports (e.g., road to the Final Four™), Wimbledon™, or the Olympic™ games, where multiple events are broadcast at the same time. Content item delivery services, including terrestrial, over-the-top (OTT), streaming and video-on-demand (VOD) services, also enable users to consume multiple content items at the same time.

One example of when a user may wish to consume multiple content items at the same time is the consumption of content items relating to basketball. On gameday, there may be multiple NBA™ games taking place at the same time. In order to watch all the games, some NBA fans may put multiple physical televisions in the same room, and/or use a tablet and/or a smart phone. In some restaurants and sports bars, multiple broadcasts of NBA games, in addition to other sports, may also be displayed on several physical televisions.

In some cases, televisions may have a picture in picture (PiP) mode, and some users may use the PiP mode to watch multiple games. Some televisions may also enable multiple channels to be viewed in a grid type layout, which some users may use to watch multiple games. While the aforementioned examples may enable a user to consume multiple content items at the same time, none of the examples is an ideal solution, and they all have drawbacks. For example, in addition to it being physically unwieldy to move multiple televisions into the same room, having the audio of the content on for all the games can create unintelligible noise and an unpleasant experience for the user. Multiple audio outputs also may confuse the user as to which audio relates to which display.

Typically, in a public setting where there are multiple TVs playing, the audio is turned down to the minimum with closed captions enabled or turned off with closed captioning. Although the solution solves the issue of having audio outputs of several displays at the same time, closed captioning takes away from the excitement the crowd noise at the game adds to the enjoyment and quality of the experience.

Other attempts to manage the audio output in a public setting where there are multiple TVs playing include having the volume on for only the most popular game and muting other TVs. A problem with this approach is that the user is confined to watching only one game with audio and may not be able to switch between games. The option to keep changing the volume of different TVs via a remote control is too cumbersome.

Outside of physical TVs, virtual reality TVs are also used to view content. In a virtual environment, the user may have the option of consuming content from more than one virtual TV. The problems described in relation to the physical TVs also exist in the virtual world. For example, if audio of all of the virtual TVs is turned on, then the audio output into a headset that is used to consume the virtual content will have crosstalk and noise from all audio outputs, which takes away from enjoying any one game. One option presented to solve the crosstalk and noise issue may be to allow the user to turn on audio from one virtual display and have the audio of others muted. As explained above, similar to physical TVs, if the user wishes to consume content from multiple virtual TVs, having the volume of only one virtual TV turned on, such as a first virtual TV, even though the user may have started consuming content from another virtual TV, such as a second virtual TV whose volume is turned off, will confuse the user by hearing volume of the first virtual TV while the user is consuming content from the second virtual TV and not provide a good quality of experience.

Thus, there is a need for better systems and methods for allowing a user to consume content from multiple displays while minimizing crosstalk and noise that can be created due to audio output from the displays.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
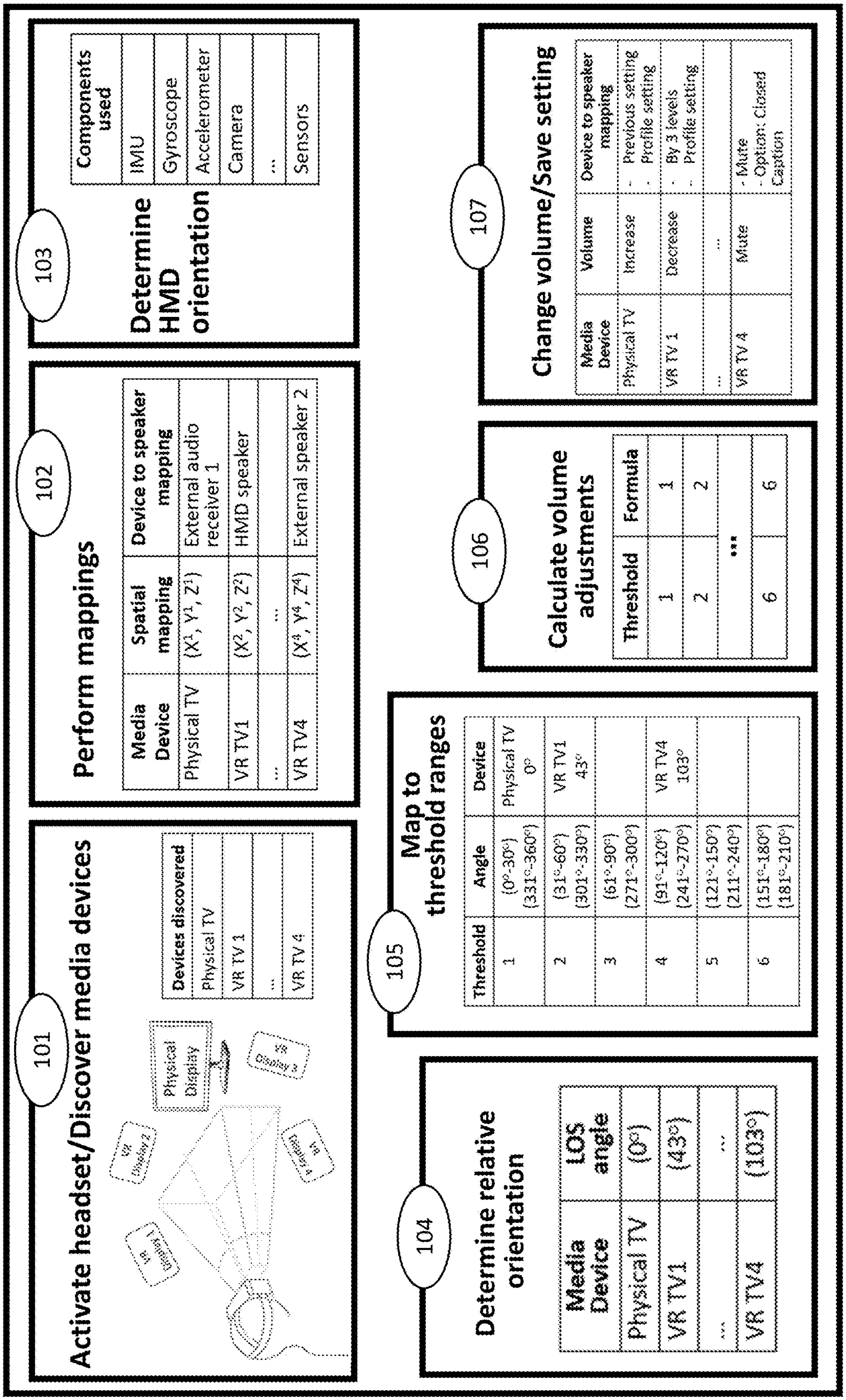
FIG. 1 is a block diagram of a process for adjusting volume of a display via an extended reality device, in accordance with some embodiments of the disclosure.

In accordance with some embodiments disclosed herein, some of the above-mentioned limitations are overcome by adjusting the volume of content played on a physical or an extended reality (XR) display based on a position of the gaze of a user who is consuming the displayed content via an extended reality device, such as a headset or a non-headset type wearable device that include an optical or video see-through functionality. Some of these limitations are also overcome by monitoring of six degrees of freedom (6DOF) of the extended reality device, determining a user's gaze based on the transitional and orientational coordinates of the extended reality headset, determining if either a physical or an extended reality display falls within a field of view of the extended reality device based on the current transitional and orientational coordinates of the extended reality device, and increasing the volume of content on a display that is at a higher focus than other displays that are either not in field of view or at a farther angle than the display towards which the user's gaze is focused.

In one embodiment, the control circuitry associated with the extended reality device determines the location and pose of the extended reality device. The control circuitry may be located in the extended reality device, a server associated with the extended reality device, or another device that is associated with and communicatively coupled to either the extended reality device or the server.

The control circuitry may also spatially map all displays, both physical displays and extended reality displays, and all audio devices, such as physical speakers and receivers as well as Bluetooth speakers of the extended reality device.

The process of determining the location and pose of the extended reality device and spatially mapping of the displays and speakers may be interchangeable and performed in any sequence. The process may also be a continuous process as the extended reality device, displays, and audio device may be moved from time to time. The process may also be performed in real time to accurately determine the relative positions of the augmented reality headset, displays, and audio device such that the control circuitry is aware in real time which displays are in the field of view of the extended reality display.

In one embodiment, the spatially mapped coordinates of the displays and the audio devices may be stored in a table.

The table may also include the coordinates of the current location of the extended reality device, which may be updated continuously, periodically, upon detection of a motion, and in real time. In some embodiments, the extended reality device's location, which includes all 6DOF coordinates (e.g., both transitional and orientational coordinates), may be obtained by the control circuitry from the inertial measurement unit (IMU) located in the extended reality device, such as in a XR headset. The control circuitry may also store an association between a display and an audio device on which the content from the display is to be audibly outputted. The audio devices may include physical speakers, receivers, and Bluetooth connected to audible speakers within the extended reality device, such as speakers in an XR headset or earbuds and earphones associated with the XR headset. Any display, whether a physical display or an extended reality display, may be mapped to any audible device. In some embodiments, all the displays, whether a physical display or an extended reality display may be mapped to a single audio device. The volume of the audio device may be updated via the audio controls of the audio device, wirelessly via Bluetooth and Wi-Fi from another device, via the extended reality device, or, if its integrated speakers are part of a television or media set, then through the audio controls of the television or the media device.

The control circuitry, in some embodiments, monitor the movements of the extended reality device worn by the user. If the user moves their head, orientates their head at a different angle, or walks from one location to another location in the spatially mapped room, then the control circuitry obtains the extended reality device's coordinates in the spatially mapped room and updates them, such as in a table.

The control circuitry may also determine the FOV from the extended reality device based on the extended reality device's most current pose. As a user moves their head, orientates their head at a different angle, or walks from one location to another location in the spatially mapped room, at each interim step, such as at each micro-second, in real time, or at predetermined intervals, the control circuitry updates the FOV from the extended reality device.

In some embodiments, the control circuitry may determine a narrower span of sight within the FOV. For example, if an FOV spans +/−45° from the headset, the control circuitry may determine that the line of sight (LOS), which is a narrower span and subset of the FOV, only spans +/10°. As used herein, the terms LOS and gaze may be used interchangeably to mean the same. The control circuitry may determine such narrower span, i.e., the LOS within the FOV, based on monitoring the user's eyeballs via an inward-facing camera of the extended reality device. Monitoring at such a granular level of LOS allows the control circuitry to determine on which display the user's attention is focused.

Instead of using the inward-facing camera, or in conjunction with its use, the control circuitry may also determine which display the user's attention is focused on and which displays are in the user's peripheral sight of the FOV by determining an angle between the user's extended reality device and the display device. For example, the relative angle may be determined based on camera(s) external to the extended reality device (also referred to as orientation measuring component), by the IMU of the extended reality device, such as an XR headset, or by the control circuitry. Once the FOV, LOS, and angles between the extended reality device and the display device are determined, the control circuitry may increase the volume of the display based on their angles. In some embodiments, the control circuitry may place each window of angles into ranges, such as Range 1, 2 . . . n, or range a, b . . . n, or some other denomination. The control circuitry may associate a volume level for each range based on preferred volume from the user profile, volume at which the user previously consumed the same content on the same display, volume recommended for the content by other users, or a certain formula.

In some embodiments, the control circuitry may enhance the volume of a display on which the user's gaze is focused and either mute, lower the volume, or start closed captioning for other displays on which the user's gaze is not focused. As the user goes back and forth between multiple displays in the spatially mapped room, such as to consume content from multiple displays, the movement of the user's gaze is used to control the volumes of each display such that whatever display is of current focus, its volume is enhanced and other noise, i.e., volume from other displays, is minimized.

In some embodiments, the control circuitry may establish a connection with only those displays that are in the FOV and in other embodiments the control circuitry may establish a connection with all spatially mapped displays in the room where the extended reality device is being used. In other embodiments, the control circuitry may establish and drop connections based on a continuous basis based on whether the displays are in FOV. It may also determine that the user is switching their gaze back and forth only between 3 of 7 total spatially mapped displays in the room and as such establish and maintain connection with only the 3 displays that the user has gazed upon. In yet other embodiments, the control circuitry may simultaneously establish connection with two or more displays, a set number of display, or displays as they come in and out of FOV. The control circuitry may also establish connection with those displays that are outputting content that is in the user preferences or based on user consumption history over other displays that are outputting content that is lower in rank in the user's profile or not as often consumed as other content. The control circuitry may also rank content and select displays based on which display is displaying the higher ranked content or content that is likely of higher interest to the user.

FIG. 1 is a block diagram of a process for adjusting volume of a display via an extended reality device, in accordance with some embodiments of the disclosure. In one embodiment, at block 101, an example environment having both physical displays (also referred to as physical display devices) that are associated with a physical media device and extended reality displays are displayed. The displays are located in a spatially mapped room, such as the room depicted in FIG. 4.

In one embodiment, the extended reality device, also referred to as XR device, is an extended reality headset, such as a virtual reality, augmented reality, or mixed reality headset, is worn by a user. The extended reality headset may be a head-mounted extended reality device. It may be a device that can be worn by a user by wrapping around their head, or some portion of their head, and in some instances, it may be all encompassing the head and the eyes of the user. It may allow the user to view both real life objects, such as a physical television set or media device and a physical display associated with the television set or the media device, as well as extended reality content on an extended reality display. The extended reality display is a display that is not in the real or physical world and exists only in a virtual world. It may be a virtual, augmented, or mixed reality display that is visible through the extended reality headset and used for playing extended reality content, such as virtual or augmented reality games.

In some embodiments, the extended reality device (XR device) may be a non-headset device. For example, the extended reality device may be a wearable device, such as smart glasses with control circuitry, that allows the user to see through a transparent glass to view the surface. Such see through may be an optical or a video see through functionality. In other embodiments, the extended reality device may be a mobile phone having a camera and a display to intake the live feed input and display it on a display screen of the mobile device. The devices mentioned may, in some embodiments, include both a front-facing or inward-facing camera and an outward-facing camera. The front-facing or inward-facing camera may be directed at the user of the device, while the outward-facing camera may capture the live images in its field of view. The devices mentioned above, such as smart glasses, mobile phones, virtual reality headsets, and the like, for sake of simplification, are herein referred to as extended reality devices or extended reality headsets.

In some examples, the extended reality device may comprise means for eye tracking, which may be used to determine the focus of a user's gaze thereby determining what objects or displays are in the field of view (FOV) of the user when the user is viewing through the worn extended reality device.

The FOV of the user may change based on the transitional and orientational position and pose of the user. For example, a user may rotate their head, while wearing the extended reality device, to the left. Such orientation may allow the user to see a first set of objects and displays in their FOV. Subsequently, when the user turns their head to the right, those displays and objects that were in the FOV when the user had oriented their head to the left may no longer be in their FOV.

In some embodiments, only a physical display associated with a physical television or media device may fall within the FOV of the user. In another embodiment, only an extended reality display may fall within the FOV of the user. In yet another embodiment, a mixture of both one or more physical displays associated with one or more physical television or media devices and one or more extended reality displays may fall within the FOV of the user.

When a physical display falls within the FOV of the user, in some embodiments, playback of respective content items, such as a live television stream, a time-shifted television stream and/or a VOD stream, may be displayed on the physical display. The physical display may also receive a content item via VOD or via a live television stream.

When an extended reality display falls within the FOV of the user, in some embodiments, the extended reality display may receive a content item via live multicast adaptable bitrate stream or an OTT stream. It may also receive content from an electronic device to which it is communicatively connected, such as via a Bluetooth connection.

In one embodiment, as depicted in block 101, a spatially mapped room may include one physical display associated with a physical media device and four extended reality displays. The user may activate the extended reality and discover or detect both the physical and the extended reality displays in the spatially mapped room, such as the displays depicted in the room in FIG. 4. The discovery may be through the extended reality device being connected to the physical display and the extended reality displays, such as via a Bluetooth connection. The discovery or detection may also comprise, upon powering on, the extended reality device may query for display devices in the vicinity, such as by sending a signal to detect which display devices respond to the query and thereby determining the existence of such display devices in its vicinity. The detection may be automatic upon powering on, upon execution of a software routine, or may ask the user to provide a selection that would initiate the detection. A table that displays all the displays in the spatially mapped room to which the extended reality device is connected may also be displayed in a display of the extended reality device.

At block 102, in one embodiment, control circuitry associated with the extended reality device may determine the spatial location of each display to which the extended reality device is communicatively connected. The control circuitry may also be associated with a server or a system, such as the server 202 depicted in FIG. 2A. For example, the spatial location of the physical TV may be $X^1$, $Y^1$, $Z^1$, the spatial location of the extended reality display VR TV1 may be $X^2$, $Y^2$, $Z^2$, and the spatial location of the extended reality display VR TV4 may be $X^4$, $Y^4$, $Z^4$. The physical display and the extended reality displays may, in one embodiment, be located at different spatial locations from each other, i.e., apart from each other and not in the same location. The spatial locations may be referenced to either a physical origin, such as the extended reality device, a corner of the spatially mapped room, or an object in the spatially mapped room. The origin may also be located at a virtual location within an image in the headset.

In some embodiments, a spatial central point of reference may be assigned to the physical and extended reality displays. The spatial central point may have spatial tag coordinates located at the center of the physical and/or extended reality display. In other embodiments, the spatial tag coordinates may be located at corners or other locations of the physical and/or extended reality display.

At block 102, in one embodiment, once the displays in the spatially mapped room and their locations have been identified, the control circuitry may map the coordinates of each device with respect to the location of the extended reality device. Such mapping may allow the control circuitry to determine a relative distance and orientation between the displays and the extended reality device, i.e., where the displays are located and oriented in the spatially mapped room in relative to where the extended reality device is located.

At block 102, in one embodiment, the control circuitry may map a speaker to each identified display in the spatially mapped room. As depicted, the physical TV at location $X^1$, $Y^1$, $Z^1$ may be mapped to external audio receiver 1; the extended reality display VR TV1 located at $X^2$, $Y^2$, $Z^2$ may be mapped to the head-mounted display (HMD) speaker; and the extended reality display VR TV4 located at $X^4$, $Y^4$, $Z^4$ may be mapped to external speaker 2. The control circuitry may maintain a table of all displays and their mapped speakers and change the mapping as they are updated.

Figure 5:
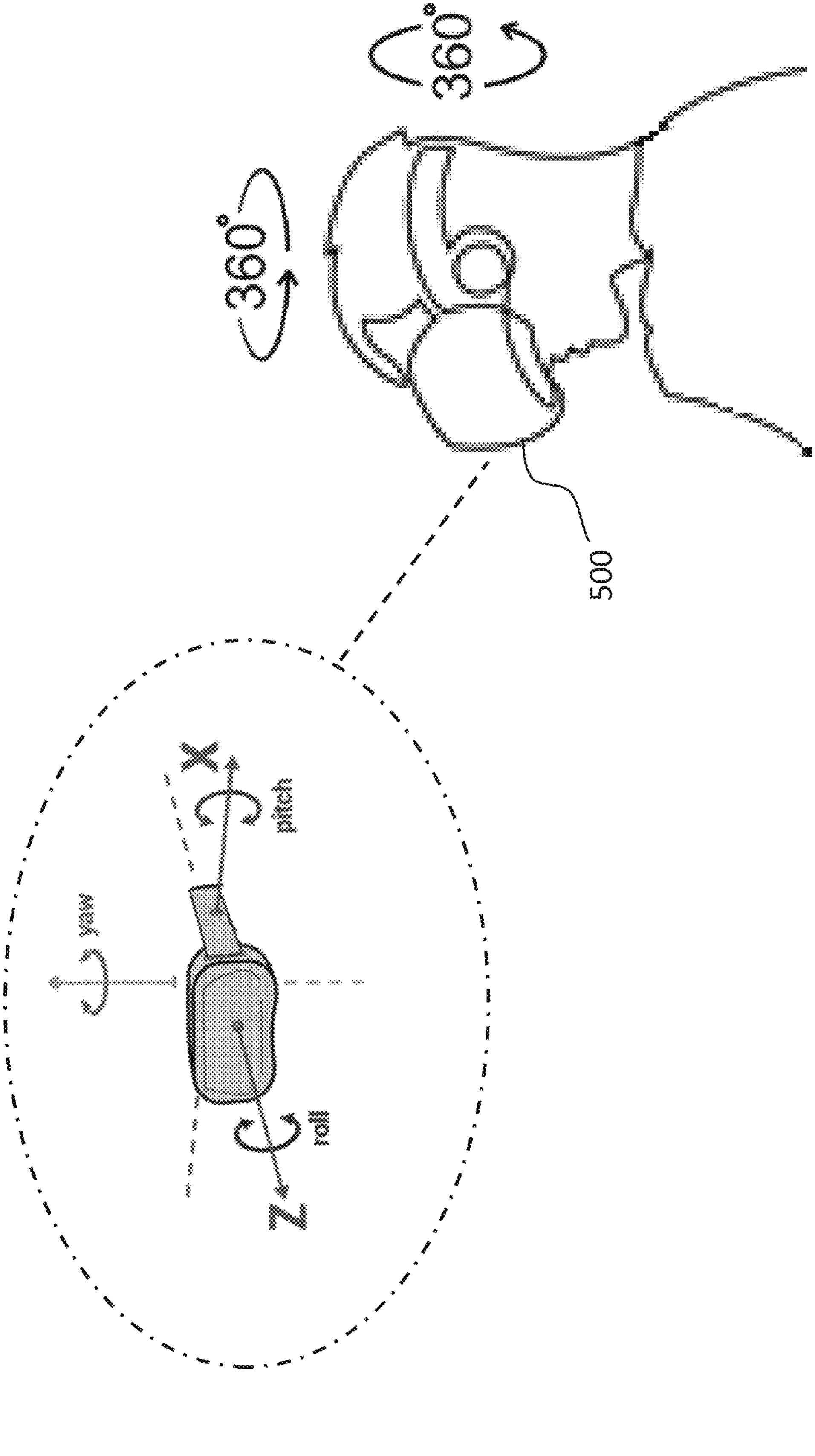
FIG. 5 is a block diagram of an extended reality headset used for controlling the volume of the physical and extended reality displays, in accordance with some embodiments of the disclosure.

At block 103, in one embodiment, the control circuitry may determine the current location of the extended reality display. The location may include both the transitional as well as the orientational location of the extended reality device as depicted in FIG. 5. Since the user wearing the extended reality device may move freely around the spatially mapped room transitionally and may orient in a 360° circle, the current location of the extended reality device may continuously change. As such, in some embodiments, the control circuitry may update the extended reality device's location on a continuous basis in real time or it may do so at periodic intervals. The control circuitry may also calculate the current location after a motion of the headset is detected.

To determine the current location and orientation, the control circuitry may utilize one or more hardware components of the extended reality device. These components may include an inertial measuring unit (IMU), a gyroscope, an accelerometer, a camera, and sensors, such as motion sensors, that are associated with the extended reality device. For example, the control circuitry may obtain the coordinates of the extended reality device from the IMU and execute an algorithm to compute the headset's rotation from its earlier position to its current position and represent the rotation by a quaternion or rotation matrix. In some embodiments, the gyroscope located in the IMU may be used by the control circuitry to measure the angular velocity or the rotation. In this embodiment, the control circuitry may use the angular velocity at which the extended reality device has rotated to compute the current orientation.

Based on the current location of the extended reality device, the control circuitry may determine the FOV from the headset. The FOV may allow the control circuitry to determine which displays fall within the FOV of the extended reality device based on its current location and which displays are outside the FOV. In some embodiments, the extended reality device's FOV may be determined at an operating system level at the extended reality device, and in other embodiments, it may be determined via an application running on the extended reality device. In yet other embodiments, the FOV may be determined at a location remote from the extended reality device, for example at a server.

In some embodiments, the control circuitry may determine an angle of the FOV. Such angle determination may allow the control circuitry to determine where the spatial tag for physical displays or the extended reality displays falls in the FOV. For example, if a spatial tag of a display is located at the center of the display and the spatial tag coordinates are within an angle of the FOV, then the control circuitry may determine that the display is in the FOV. In other embodiments, if the special tag is at a corner of the display, even though some portion of the display may be in the FOV, if the spatial tag is not in the FOV, then the control circuitry may determine that the display is not in the FOV. The control circuitry may also make determinations whether the display is partially or fully in the FOV based on the angle.

Figure 6:
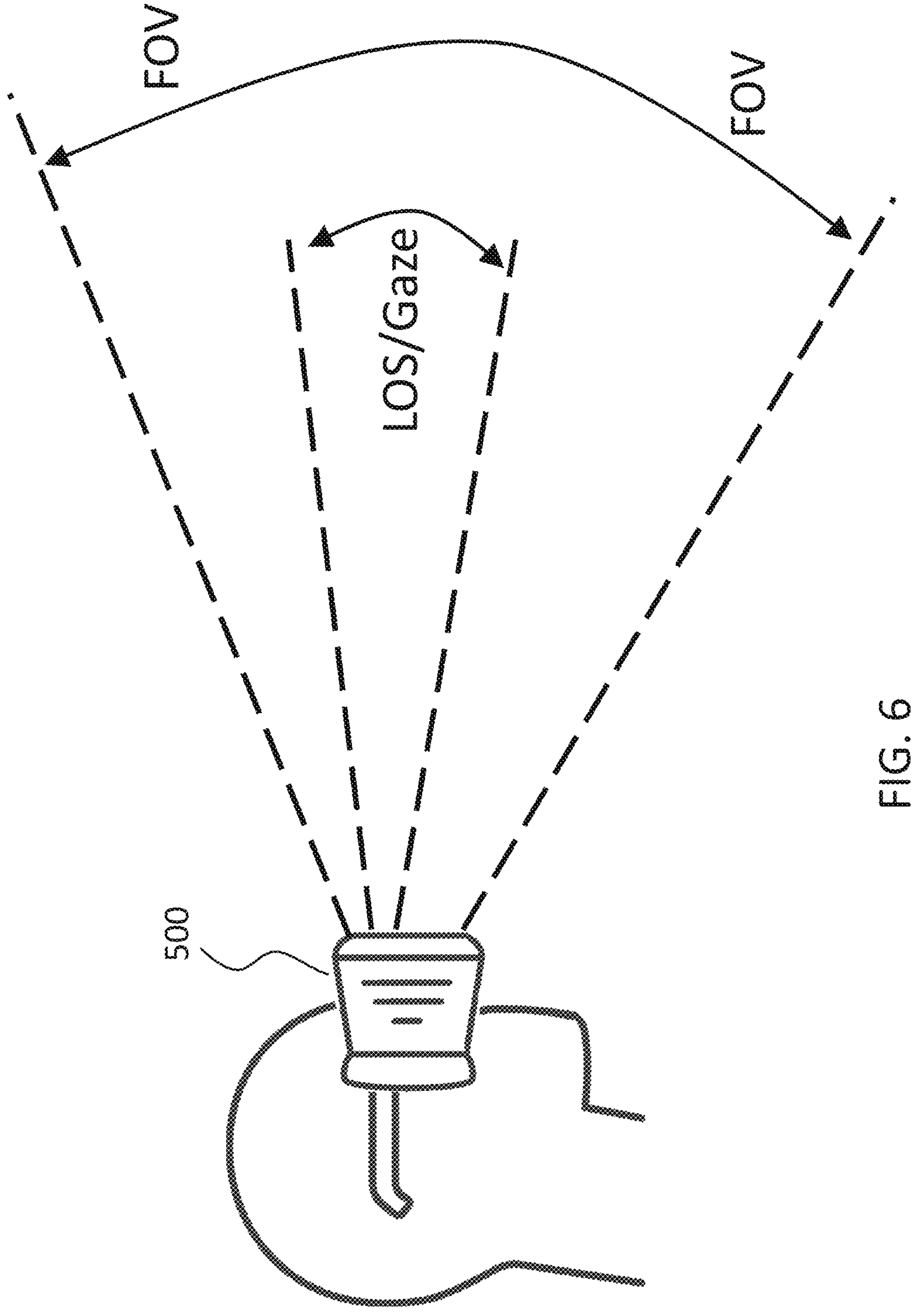
FIG. 6 is a block diagram of a field of view (FOV) and the user's gaze, in accordance with some embodiments of the disclosure.

In some embodiments, the control circuitry may also determine the line of sight (LOS) (also referred to as gaze or user's gaze) of the extended reality device. In one embodiment, the LOS is narrower than the FOV and determines on a granular level where within the FOV the sight is focused. Additional detail relating to FOV, and LOS is depicted in FIG. 6 below. In one embodiment, the control circuitry may determine the LOS based on the current transitional and orientational location of the extended reality device. In another embodiment, the control circuitry may utilize and inward-facing camera that can monitor and detect the movement of the user's eyeballs to determine the LOS. In other words, the inward-facing camera may be used to detect the gaze of the user's eyeballs and determine where within the FOV the gaze is focused. The inward-facing camera may also be used to determine depth perception of the user's eyeballs and determine whether the gaze is focused on a near or far object that is within the FOV.

At block 104, the control circuitry determines an angle of all the displays relative to the current location of the extended reality device. As depicted, the physical TV is at 0° from the current location of the extended reality device, the extended reality display VR TV1 is at 430 and the extended reality display VR TV4 is at 103° from the current location of the extended reality device. This means that, based on the current orientation of the extended reality device, the physical TV is directly in the LOS.

At block 105, the control circuitry may associate each angle with a predetermined threshold for volume adjustment. Since an angle can be measured either clockwise or counterclockwise, a table depicting both clockwise and anticlockwise angles for the same display may be generated. For example, the physical TV may be both at an angle of 0° as well as 360°, depending on whether the clockwise or anticlockwise measurement is used. The table may also include a threshold range of volume adjustment for each range. For example, if a display is within 0°-30° angle from the LOS of the extended reality device, then the control circuitry may associate the angle with threshold 1. In some embodiments, a display that falls within threshold 1, which has a 0°-30° angle from the LOS, i.e. a short distance or angle from the LOS, the display may be associated with the highest user interest for a time period when the user's gaze is within threshold 1. In other words, the user may be focused for the period of time when the angles is within 0°-30° at the game or other content that is being outputted on the display. Likewise, if a display is within 31°-60° angle from the LOS of the extended reality device, then the control circuitry may associate the angle with threshold 2, and so on.

At block 106, the control circuitry associates each threshold with a volume level. In one embodiment, the volume level may be a predetermined volume level. The predetermined volume level may be set by the control circuitry or by a user. If a user has a preferred volume level, such preference may be stored in a user profile. In another embodiment, the volume level may be the lowest volume level or the highest volume level. In yet another embodiment, the volume level may be based on a volume recommendation for specific content displayed on the display. For example, such recommendation may be provided by a content creator or other users that have consumed the content. In another embodiment, the volume level may be the volume from a previous setting when the user had turned off the display or a previous volume setting that the user had used for the type of content. In yet another embodiment, the volume level may be the same volume level the user used when consuming similar content or another episode of the same series of content.

At block 107, the control circuitry may increase, decrease, or maintain the volume of a display based on the user's gaze determined at block 103 and the angle of the display from the extended reality device determined at block 104. For example, the closer the display is to the user's gaze, such as the shorter the angle, the louder the desired volume for the display may be. For example, in one embodiment, the control circuitry may determine that the display associated with the physical TV is at 0° and the extended reality display VR TV1 is at 43° and VR TV4 is at 1030 from the extended reality device. Accordingly, the control circuitry may associate the angles with volume thresholds as depicted in blocks 105 and determines an assigned volume level at block 106. Based on the determinations at blocks 104-106, as depicted in block 107, the control circuitry may increase the volume of the physical TV to a volume setting that is provided in the user profile. It may also decrease the volume level for extended reality display VR TV1 by three level settings, which may have been provided by the user in their user profile. The control circuitry may also mute the volume for extended reality display VR TV2 such that no sound is outputted. In addition to muting the extended reality display VR TV2, the control circuitry may also turn on and display closed captions related to the content being presented on VR TV 2.

The relative angles and locations between the extended reality device and the physical display or extended reality display are what control the volumes of the display. In other words, if a determination is made that the user's LOS is directed towards the physical display and not the extended reality display VR TV1, then the control circuitry associates such LOS towards the physical TV as the content of current interest to the user. Accordingly, the control circuitry increases the volume of the physical TV such that it can be heard by the user and minimizes volumes of other displays to reduce the noise of content that is not of current interest.

There may be several real-world applications that may lend to increasing, decreasing, and maintaining volume based on the user's gaze. While there may be several use cases, the following embodiment is described to illustrate one such use case.

In this embodiment, a user may be wearing an augmented reality headset that is capable of viewing real-life objects and displays as well as virtual objects and virtual displays within the display of the extended reality device. While wearing the headset the user may be oriented such that the user's gaze is towards a first display that is playing an NBA™ basketball playoff game between the Chicago Bulls™ and Detroit Pistons™. The control circuitry may determine that the user's gaze is at a 7° angle towards the first display. Accordingly, the control circuitry may associate the angle of gaze with the first threshold, which has a range of between 0°-30° angle from the LOS or the user's gaze. Although a 0°-30° angle is described as associated with a particular threshold, the embodiments are not so limited, and other angles may also be used.

In this embodiment, the control circuitry may access the user's profile and determine that the user prefers a volume decibel level of 27 (out of a possible maximum volume level of 50) for consuming content on the first display. Accordingly, the control circuitry determines the current volume on the first display and, if the current volume is below decibel level 27, increases the volume level until it reaches decibel level 27.

While consuming the content on the first display, in this embodiment, the user may turn their head to the right, thereby orienting the augmented reality headset they are wearing to the right as well. When the user turns their head to the right, the first display is no longer at the same angle, e.g., a previous angle of 7° prior to the user turning their head to the right.

In one embodiment, the control circuitry receives a signal that the current user has moved their head, thereby reorienting the augmented reality headset worn by them. The signal may be received based on a movement detection by the gyroscope of the IMU. The signal may also be received through other means to indicate that a movement has taken place, such as based on motion sensor data. In another embodiment, since the control circuitry monitors the user's gaze and the transitional and orientational movements of the augmented reality headset worn by the user on a continuous basis, in real time or on a periodic basis, based on the monitoring, the control circuitry may determine that the user has moved their extended reality device.

Regardless of how such a detection of the movement is made, the control circuitry, upon determining that a movement is made, may calculate the new location of the extended reality device after the movement. Since the movement is in real time, in some embodiments, the new location may be a transitional location on the user's way to their destination. For example, the user may be watching two NBA™ games at the same time with a separate NBA™ game on each display, e.g., the user may be watching NBA game between the Chicago Bulls™ and Detroit Pistons™ on the first display and NBA game Golden State Warriors™ and Boston Celtics™ on the second display. As the user turns their head towards the second display, each granular movement from the first display to the second display, i.e., including all the interim or transitional movement towards the final destination of the second display, may be captured in real time such that the most up-to-date FOV and LOS information is available to the control circuitry. In some embodiments, the capturing and updating of FOV and LOS may occur every microsecond.

In one embodiment, once the second display is in the FOV, the control circuitry calculates the angle of display and associates a threshold with the calculated angle of display. The control circuitry, as with processes executed in blocks 104 through 106, may increase the volume of the second display and lower the volume of the first display based on a determination that the user has now switched their attention from the Chicago Bulls™ and Detroit Pistons™ game on the first display to the Golden State Warriors™ and Boston Celtics™ game on the second display. In some embodiments, the user may keep turning their head back and forth between the two games on a periodic basis such that they can watch both games at the same time. The user may also turn their head at a fast pace towards a game if something exciting happens in that game, such as Stephen Curry™ scoring a three-pointer from half court. The control circuitry may monitor all such head movement, such as via components associated with the extended reality display, and in real time increase volumes of displays on which the user's gaze is focused and decrease or mute the volumes of displays that are not currently in the user's gaze.

Figure 2A:
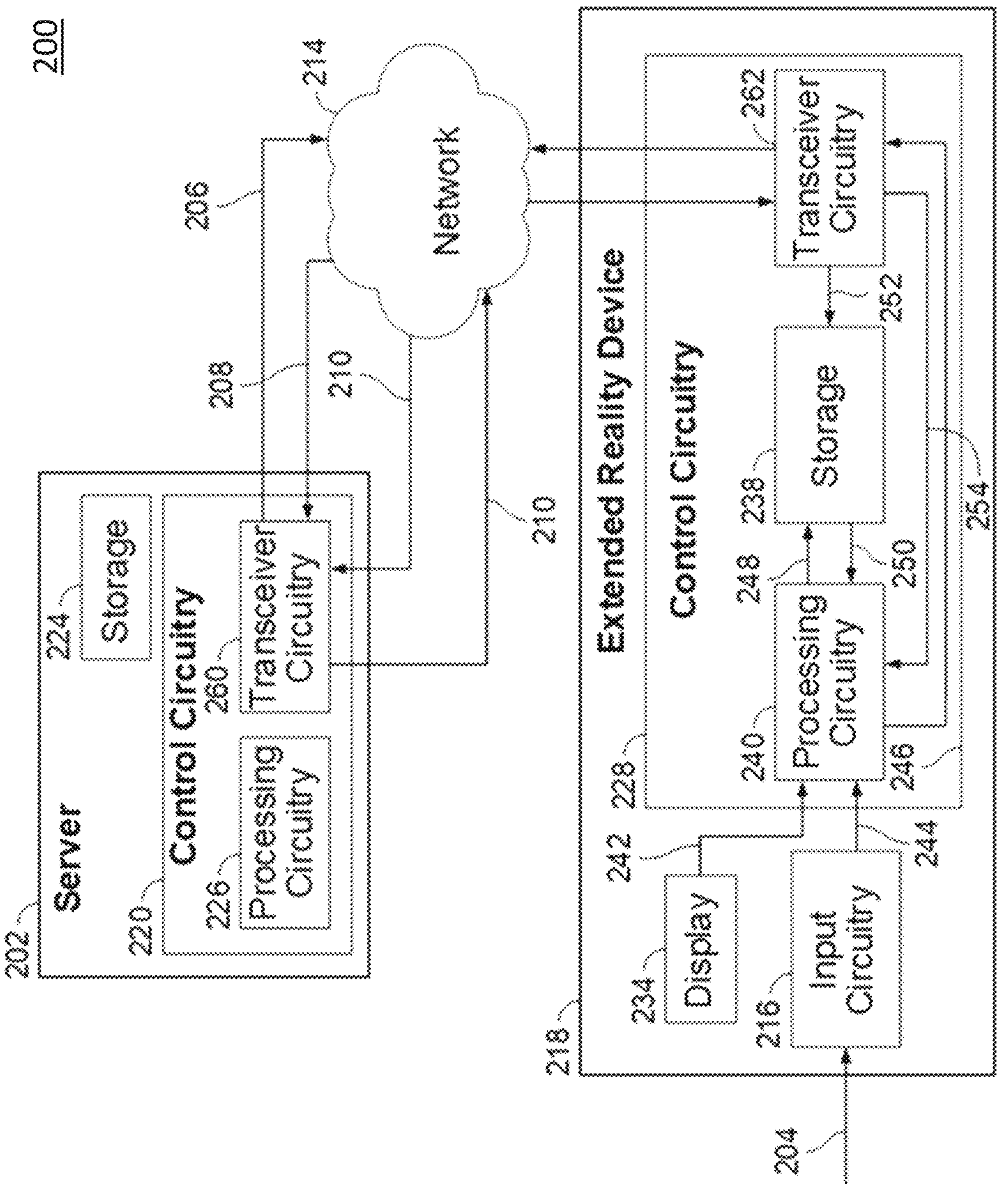
FIG. 2A is a block diagram of a system for adjusting volume of a display via an extended reality device, in accordance with some embodiments of the disclosure.
Figure 2B:
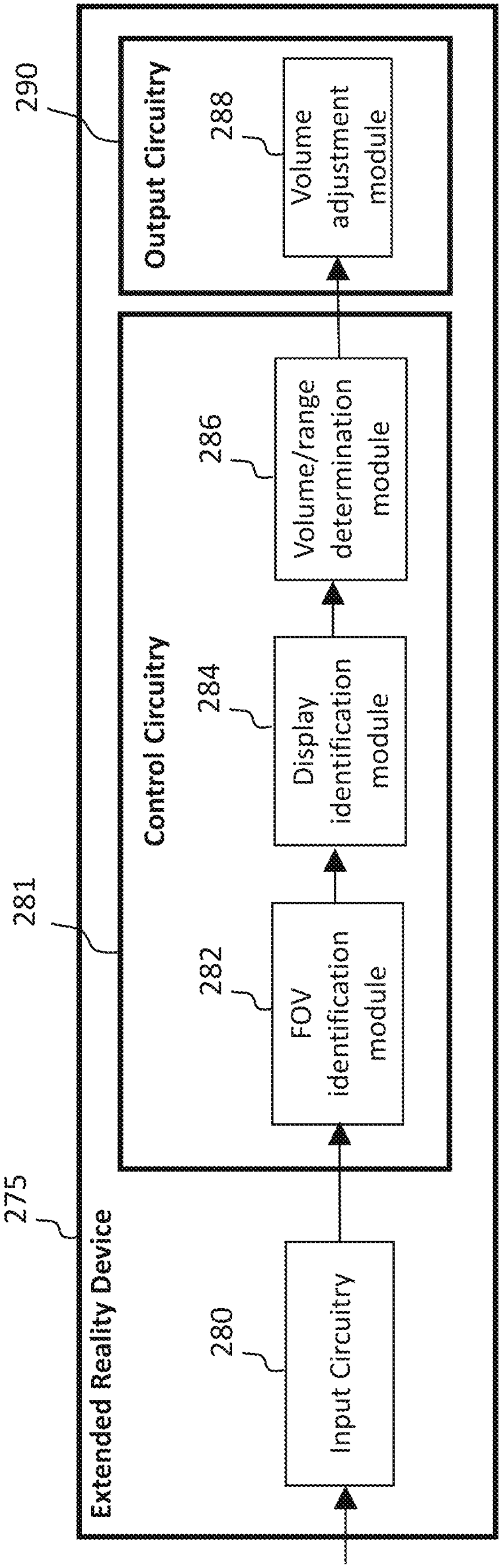
FIG. 2B is another block diagram of a system for adjusting volume of a display via an extended reality device, in accordance with some embodiments of the disclosure.
Figure 3:
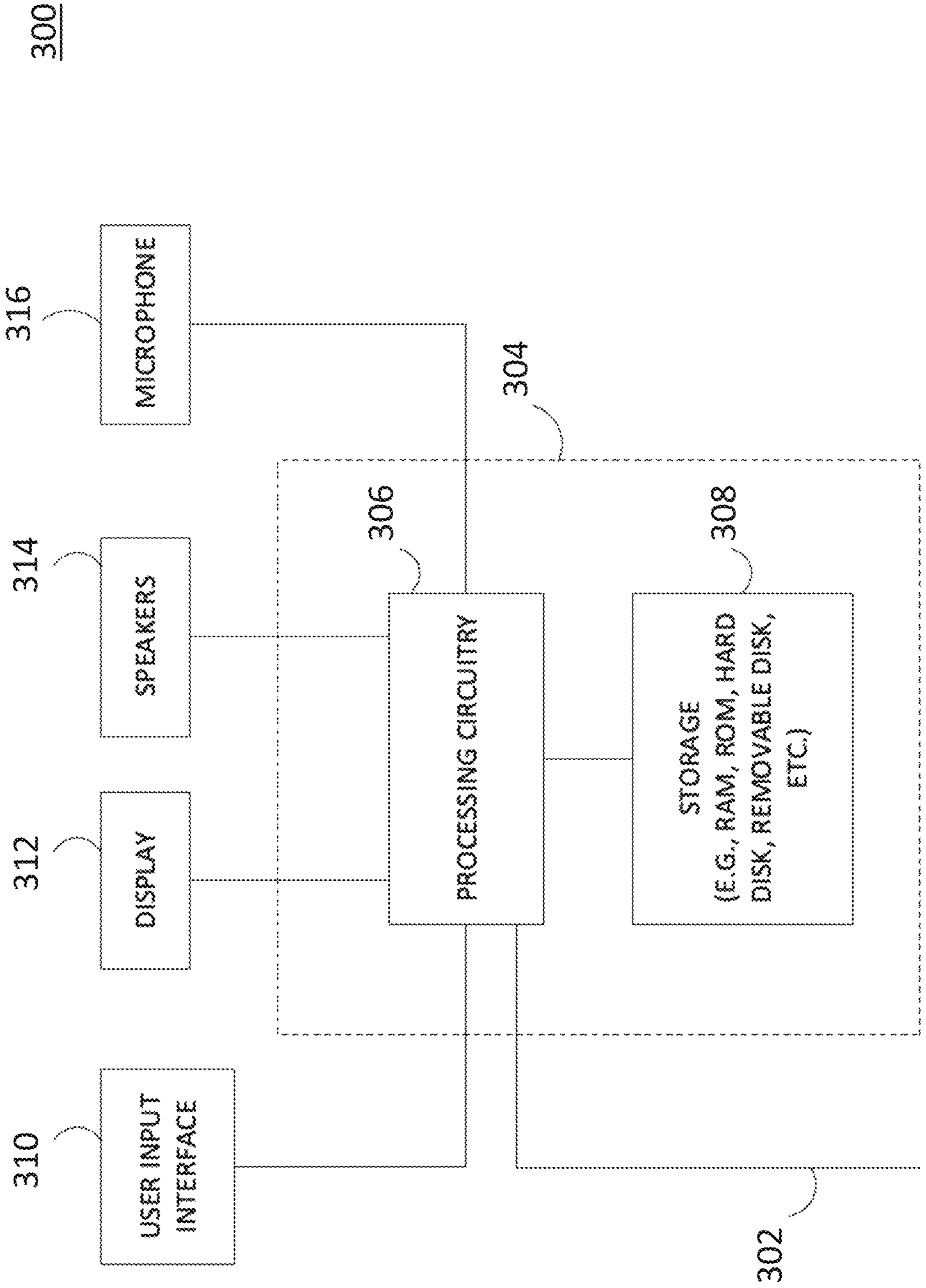
FIG. 3 is a block diagram of an extended reality device, in accordance with some embodiments of the disclosure.

FIG. 2A is a block diagram of a system, in accordance with some embodiments of the disclosure and FIG. 3 is a block diagram of an extended reality device, in accordance with some embodiments of the disclosure. FIGS. 2A and 3 also describe exemplary devices, systems, servers, and related hardware that may be used to implement processes, functions, and functionalities described in relation to FIGS. 1, 2B, and 4-16. Further, FIGS. 2A and 3 may also be used for implementing a process for adjusting volume of a display via an extended reality device, using front-facing or inward-facing camera of the extended reality device, capturing live images in its field of view of the extended reality device, capturing virtual images in the field of view of the extended reality device, determining a user's gaze, objects in the field of view of the gaze, determining what objects or displays are in the field of view based on the user's gaze, establishing Bluetooth and Wi-Fi connections between displays and audio output devices, determining the spatial location of the displays and audio devices in the spatially mapped room, mapping the coordinates of each device with respect to the location of the extended reality device, maintaining a table of all displays and their mapped speakers and change the mapping as they are updated, updating volume of each display based on the user's gaze or the field of view of the extended reality device, determining the current location of the extended reality display and determining its coordinates, measuring translational rotational movements of the extended reality device, using the gyroscope located in the IMU to measure the angular velocity or the rotation, determining a narrow subset of the field of view, which is the line of sight (LOS)(also referred to as gaze or user's gaze), movement of the user's eyeballs to determine the LOS, determining a volume range for each display based on its angle from the extended realty display, determining whether the display is within a threshold or a plurality of thresholds of angles from the extended reality display, accessing user profiles and consumption history to determine volume of preference for a display of interest, accessing previous volume settings, including previous volume setting that the user had used for the type of content, using previous volume setting as startup volume for a display, increasing, decreasing, and maintaining volume based on the user's gaze and performing functions related to all other processes and features described herein.

In some embodiments, one or more parts of, or the entirety of system 200, may be configured as a system implementing various features, processes, functionalities and components of FIGS. 1, 2B, and 4-16. Although FIG. 2A shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2A, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2A, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store user profile and preferences, such as preferences related to volume settings, locations of displays and sound output devices, ranges and their associations to angles and volumes levels, volume levels from previous settings, volume patterns based on used consumption history, volume recommendations from other users, mapping of displays to output devices, and AI and ML, algorithms. Non-volatile memory may also be used (e.g., to launch a boot-up routine and other instructions). Cloud-based storage may be used to supplement storages 224, 238 or instead of storages 224, 238. In some embodiments, data relating to user profile and preferences, such as preferences related to volume settings, locations of displays and sound output devices, ranges and their associations to angles and volumes levels, volume levels from previous settings, volume patterns based on used consumption history, volume recommendations from other users, mapping of displays to output devices and AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to determining that a user's gaze is directed at a first display and not a second or third display, the control circuitry 228 may perform the steps of processes described herein to increase the volume of the first display and decrease the volume of the second and third display.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as user profile and preferences, such as preferences related to volume settings, locations of displays and sound output devices, ranges and their associations to angles and volumes levels, volume levels from previous settings, volume patterns based on used consumption history, volume recommendations from other users, mapping of displays to output devices, and input from extended display device, such as AR or VR devices. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augment, or mixed reality device, or a device that can perform function in the metaverse, or any other device, computing equipment, or wireless device, and/or combination of the same capable of suitably displaying virtual reality displays or viewing augmented reality via the extended reality device.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 are configured to implement a process for adjusting volume of a display via an extended reality device, use front-facing or inward-facing camera of the extended reality device, capture live images in its field of view of the extended reality device, capture virtual images in the field of view of the extended reality device, determine a user's gaze, objects in the field of view of the gaze, determine what objects or displays are in the field of view based on the user's gaze, establish Bluetooth and Wi-Fi connections between displays and audio output devices, determine the spatial location of the displays and audio devices in the spatially mapped room, map the coordinates of each device with respect to the location of the extended reality device, maintain a table of all displays and their mapped speakers and change the mapping as they are updated, update volume of each display based on the user's gaze or the field of view of the extended reality device, determine the current location of the extended reality display and determine its coordinates, measure translational rotational movements of the extended reality device, use the gyroscope located in the IMU to measure the angular velocity or the rotation, determine a narrow subset of the field of view, which is the line of sight (LOS), movement of the user's eyeballs to determine the LOS, determine a volume range for each display based on its angle from the extended realty display, determine whether the display is within a threshold or a plurality of thresholds of angles from the extended reality display, access user profiles and consumption history to determine volume of preference for a display of interest, access previous volume settings, including previous volume setting that the user had used for the type of content, use previous volume setting as startup volume for a display, increase, decrease, and maintain volume based on the user's gaze and perform functions related to all other processes and features described herein. The plurality of thresholds relates to whether the display angle is within a FOV threshold as well as LOS threshold. It may also relate to the display being in FOV but not LOS. It may also refer to being at an angle which is above a first range but below a second range, i.e., such as within a window of a threshold.

Computing device 218 receives a user input 204 at input circuitry 216. For example, computing device 218 may receive a user input like the user's gaze towards a physical or virtual display.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, movement or gestures to digital signals, or translational or orientational movement of the mixed reality headset. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 2B, 9-16, respectively.

FIG. 2B shows a block diagram representing components of a computing device and dataflow therebetween for controlling volume adjustments of content displayed on a display via an extended reality device, in accordance with some embodiments of the disclosure. Extended reality device 275 comprises input circuitry 280, control circuitry 281 and output circuitry 290. Control circuitry 281 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 280. The input circuitry 280 is configured to receive inputs related to the extended reality device. For example, this may be via a gaze if the user or a gesture detected via an extended reality device. In other examples, this may be via an infrared controller, Bluetooth and/or Wi-Fi controller of the extended reality device 275, a touchscreen, a keyboard, a mouse and/or a microphone. In another example, the input may comprise instructions received via another computing device. The input circuitry 280 transmits the user input to the control circuitry 281.

The control circuitry 281 comprises a field of view (FOV) identification module 282, a display identification module 284, a volume/range determination module 286, and a volume adjustment module 288. The input is transmitted to the FOV identification module 282, where an FOV of an extended reality device is determined. An indication of the FOV is transmitted to the display identification module 284, where it is determined if, and how many, displays fall within the FOV. An indication of the displays that fall within the FOV is transmitted to the volume/range determination module 286, where the relative angle between the extended reality device and the display is determined and the angle is associated with a volume range. In some embodiments, the relative angle is determined based on a camera, or a set of cameras, located in a room or space that is within a vicinity (or threshold distance) of the extended reality device such that the extended reality device and the displays are visible to the camera or to the set of cameras. In such embodiments, the camera or the set of cameras are able to determine angle of the extended reality device and the display, and the data may be used by control circuitry to calculate the relative angles. Other embodiments may also be used to calculate the relative angle. For example, the IMU in the extended reality device may determine the coordinate at which the user's gaze is directed and also determine the coordinates of a display nearby. The IMU or the control circuitry may then calculate an angle between user's gaze and the display based on the coordinates. The angles may also be computed based on another reference point, such as an origin in the room where the extended reality device is being used.

Once the relative angle is determined, in some embodiments, the volume range may be predetermined based on the relative angle between the extended reality device and the display. The volume range may also be determined based on the last volume from a previous exit of the same content, a user preference from the profile of the user, or a formula that is computed based on the relative angle. Instructions of how to update the volume of a display in the FOV may be sent to the volume adjustment module 288, and, upon receipt of the instructions, the volume adjustment module 288 may adjust the volume of the display by either increasing the volume, decreasing the volume, muting the volume, or starting closed captioning.

FIG. 3 shows a generalized embodiment of an extended reality device 300, in accordance with one embodiment. In an embodiment, the extended reality device 300, is the same equipment device 202 of FIG. 2A. The extended reality device 300 may receive content and data via input/output (I/O) path 302. The I/O path 302 may provide audio content (e.g., tone in one ear of a user for solving a CAPTCHA challenge). The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server-based embodiments, the control circuitry 304 may include communications circuitry suitable for allowing communications between two separate user devices, such as the extended reality device and a display and/or an output audio device to determine the user's gaze and accordingly increase or decrease the volume of the display and perform functions related to all other processes and features described herein, including those described and shown in connection with FIGS. 1, 2B, and 4-16.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "extended reality device," "electronic storage device," or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store user profile and preferences, such as preferences related to volume settings, locations of displays and sound output devices, ranges and their associations to angles and volumes levels, volume levels from previous settings, volume patterns based on used consumption history, volume recommendations from other users, mapping of displays to output devices, and AI and ML algorithms and all the functionalities and processes discussed herein. Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the extended reality device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the extended reality device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The extended reality device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display or it may be the screen of the extended reality device. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The extended reality device 300 of FIG. 3 can be implemented in system 200 of FIG. 2A as primary equipment device 202, but any other type of user equipment suitable for allowing communications between two separate user devices for performing the functions elated to implementing machine learning (ML) and artificial intelligence (AI) algorithms, and all the functionalities discussed associated with the figures mentioned in this application The extended reality device 300 of any other type of suitable user equipment suitable may also be used to implement ML and AI algorithms, and related functions and processes as described herein. For example, primary equipment devices such as television equipment, computer equipment, wireless user communication devices, or similar such devices may be used. Electronic devices may be part of a network of devices. Various network configurations of devices may be implemented and are discussed in more detail below.

Figure 4:
FIG. 4 is an example of a spatially mapped room with a plurality of displays, in accordance with some embodiments of the disclosure.

FIG. 4 is an example of a spatially mapped room with a plurality of displays, in accordance with some embodiments of the disclosure. In this embodiment, spatially mapped room 400 includes two physical displays 402*a* and 402*b*. These are physical displays that are associated with a physical television, projector, monitor, smartphones, media device, or any other type of physical device capable of displaying or playing media content.

In this embodiment, spatially mapped room 400 also includes three virtual displays 402*c*, 402*d*, 402*e*. The area indicated by box 404 is an example FOV of a head-mounted extended reality device, which is based on the position of the user's head. In some examples, the extended reality device may comprise means for eye tracking, which may determine where the user is looking in the FOV. In this example, both physical display 402*b* and extended reality display 402*c* fall within the FOV of the user. Physical display 402*a* and extended reality displays 402*d* and 402*e* fall outside of the FOV. In this example, physical display 402*a* receives a content item via VOD or via a live television stream. Extended reality display 402*d* receives a content item via live multicast adaptable bitrate stream or an OTT stream. In other examples, the extended reality device may comprise means for tracking head pose, such as the head pose of an XR headset. If the user turns their head to the right, left, up, down, or some other orientation, such head poses may be to determine the FOV.

In some embodiments, the extended reality displays may move as the user and the attached extended reality device worn by the user also move. In another embodiment, the extended reality displays are static and do not move. In yet another embodiment, the extended reality displays move independently from the movement of the extended reality device.

In some embodiments, the extended reality displays are connected to speakers that are located in the extended reality device. In other embodiments, the extended reality displays are connected to physical speakers in the spatially mapped room. In yet other embodiments, the extended reality displays are connected to the same speakers that are used for the physical displays. The connection between the extended reality displays and the speakers may be a Wi-fi connection via a hub or may be a direct Bluetooth connection.

In some embodiments, the physical displays associated with the physical television or media device are connected to speakers that are located in the extended reality device. In other embodiments, the physical displays associated with the physical television or media device are connected to physical speakers in the spatially mapped room. In yet other embodiments, the physical displays associated with the physical television or media device are connected to a speaker or receiver that is directly connected to the physical television or media device.

In some embodiments, all the physical and extended reality displays can be connected to the same single speaker. In other embodiments, the physical and extended reality displays can be connected to different speakers.

FIG. 5 is a block diagram of an extended reality device used for controlling the volume of the physical and extended reality displays, in accordance with some embodiments of the disclosure.

In some embodiments, the extended reality devices, such as headsets, glasses, mobile phones, or other wearable devices, may be used to control the volume of the physical and extended reality displays in the spatially mapped room, such as the room depicted in block 101 of FIG. 1 or FIG. 4.

In some embodiments, the extended reality device 500 may include a complete system with a processor and components needed to provide the full extended reality experience. In other embodiments, the extended reality device may rely on external devices to perform the processing, e.g., devices such as smartphones, computers, and servers. For example, the extended reality device 500 may be an XR headset with a plastic, metal, or cardboard holding case that allows viewing, and it may be connected via a wire, wirelessly or via an application programming interface (API) to a smartphone and use its screen as lenses for viewing.

As depicted in FIG. 5, in one embodiment, the extended reality device 500 used includes 6DOF. Since the headset works by immersing the user into a virtual environment that has all directions, for a full immersive experience where the user's entire vision, including the peripheral vision, is utilized, an extended reality device that provides the full 6DOF is preferred (although an extended reality device with 3DOF can also be used).

Having the 6DOF allows the user to move in all directions and also view all physical and extended reality displays that are in the spatially mapped room. These 6DOF correspond to rotational movement around the x, y, and z axes, commonly termed pitch, yaw, and roll, as well as translational movement along those axes, which is like moving laterally along any one direction x, y, or z.

Tracking all 6DOF allows the control circuitry to capture the user's FOV and the narrower section of the FOV, i.e., the line of sight (LOS) or the user's gaze. Having the current and real-time update of the FOV and the user's gaze allows the control circuitry to determine which display is currently of interest to the user and which display(s) are of lesser interest. Accordingly, the control circuitry increases the volume based on the gaze of the display that is of current interest to the user and minimizes or mutes the volume of other displays to reduce surrounding noise.

Although some references have been made to the type of extended reality device, the embodiments are not so limited, and any other extended reality device available in the market may also be used with the embodiments described herein.

FIG. 6 is a block diagram of a field of view (FOV) and the user's gaze, in accordance with some embodiments of the disclosure. The FOV, as depicted, has a wider span than the more focused LOS or gaze of the user. The FOV is calculated by the control circuitry based on the coordinates of the extended reality device, which may be obtained from an IMU associated with the extended reality device. The IMU may provide both the coordinates of all 6DOF that correspond to rotational movement around the x, y, and z axes, as well as translational movement along those axes. The LOS may be determined, in some embodiments, based on tracking the user's eyeball movement by using an inward-facing camera associated with the extended reality device.

Figure 7:
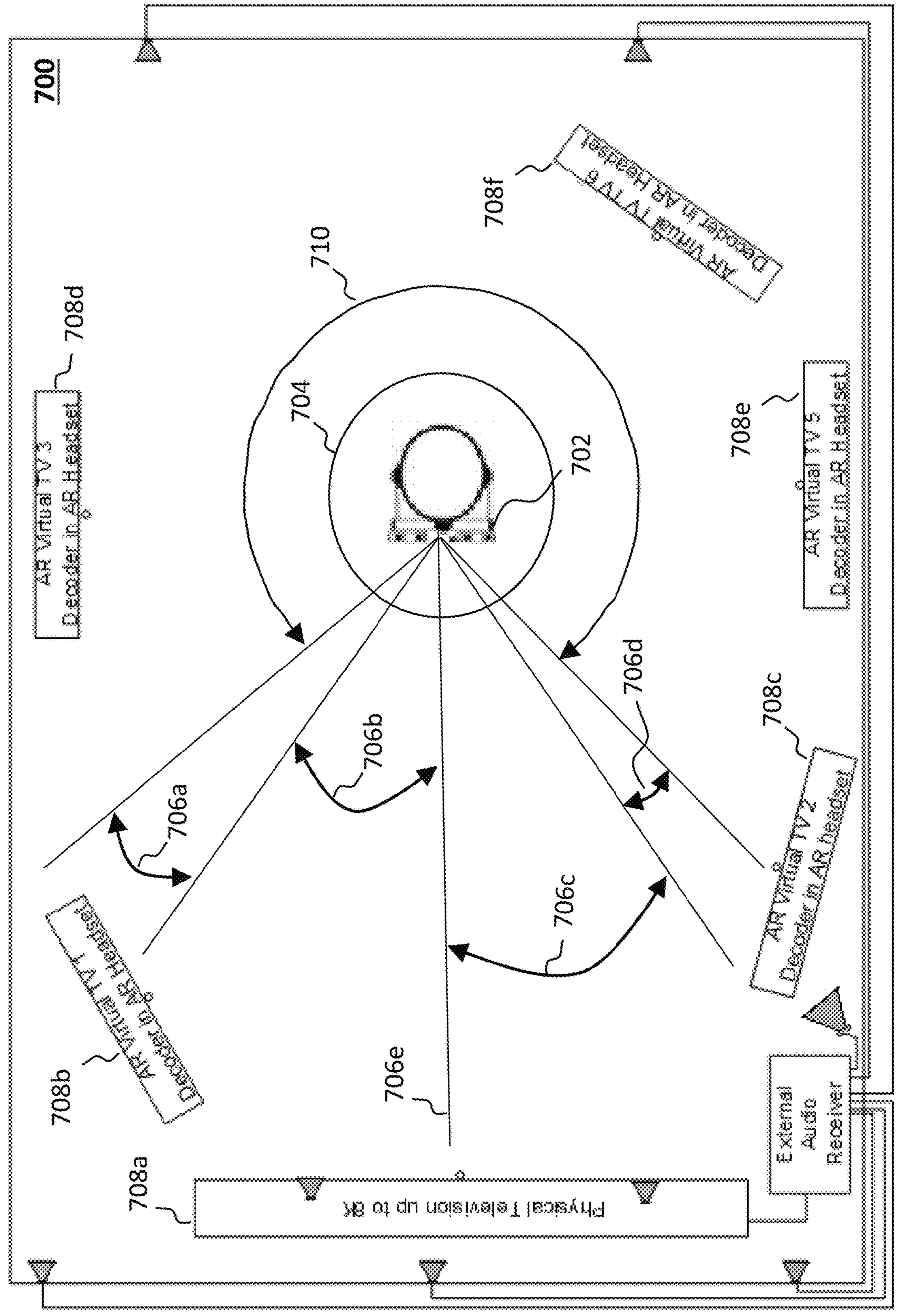
FIG. 7 is an example of a spatially mapped room in which volume of the displays is controlled via an extended reality device, in accordance with some embodiments of the disclosure.

FIG. 7 is an example of a spatially mapped room in which volume of the displays is controlled via an extended reality device, in accordance with some embodiments of the disclosure. The spatially mapped room 700 comprises an extended reality device, such as augmented reality device 702, which may be a headset or augmented reality glasses. The spatially mapped room 700 also comprises a physical television 708*a*, and virtual televisions 708*b*, 708*c*, 708*d*, 708*e*, 708*f*. In addition, a modem (not shown) transmits content and data to and from the devices 702, 708*a*, 708*b*, 708*c*, 708*d*, 708*e*, 708*f* via network (not shown) to a server (not shown). The spatially mapped room 700 is mapped by the extended reality device 702 and any physical devices, such as television 708*a* and external audio receiver. In addition, the extended reality device 702 generates a plurality of extended reality displays 708*b*, 708*c*, 708*d*, 708*e*, 708*f*, that are virtually placed around the room 700. Typically, a user wearing extended reality device 702, such as a headset, may move freely around the room and/or in a 360° circle 704. Any extended reality displays may be static and/or move as the user moves. The extended reality device has a field of view, in this example, comprising segments 706*a*, 706*b*, 706*c*, 706*d*, in which extended reality devices can be generated and displayed and physical devices can be detected. Typically, the FOV of an extended reality device 702 is smaller than that of the user. Also, as described earlier, the LOS or the gaze of the user may be an even narrower span of vision within the FOV where the user's gaze is focused. Each of the physical devices 702, and 708*a* may receive content items directly via, for example, a cable connection and/or via one or more applications running on the device 702 or 708*a* for example via an application of an OTT provider.

In one embodiment, the extended reality device 702 determines an extent to which each of the plurality of displays fall (or is visible) within the FOV of the extended reality device. This may be determined at an operating system level at the extended reality device, and in other embodiments, this may be determined via an application running on the extended reality device 702. In yet other embodiments, this may be determined remote from the extended reality device, for example at server (not shown).

In some embodiments, the physical device 708*a* may by an 8K smart television, extended reality display 708*b* may be a virtual 40-inch television, extended reality display 708*c* may be a virtual 60-inch television, extended reality display 708*d* may be a virtual 50-inch television, extended reality display 708*e* may be a virtual 46-inch television, and extended reality display 708*f* may be a virtual 32-inch television. The modem 212 may be a 5G fixed wireless access, cable or digital subscriber line modem that is connected to the extended reality device 702, the physical television 708*a* and/or the smart television device 210 via Wi-Fi and/or wired means. Data that is transmitted to and from the model to the devices 702, 708*a*, 210 includes content item data, play requests and/or pause requests from each of the physical and/or extended reality devices. In some examples, the extended reality device may utilize eye tracking to determine which display, or displays, the user is looking at. This may be achieved by tracking an angle between the direction a user's eye is looking and one or more points on a spatial map of the room 700. In some embodiments, each of the displays 708*a*, 708*b*, 708*c*, 708*d*, 708*e*, 708*f* may have a spatial central point of reference assigned to it, for example, spatial tag coordinates located at the center of the physical and/or extended reality displays, which may be used to determine whether or not a display falls within the field of view of an extended reality device. In other examples, the entire width of a display may be used to determine whether or not a display falls within the field of view of the extended reality device.

In some examples, segment 706*a* may be associated with a viewing angle of 26°-36° with respect to normal line 706*e*. Segment 706*b* may be associated with a viewing angle of 0°-25° with respect to normal line 706*e*. Segment 706*c* may be associated with a viewing angle of 335°-359° with respect to normal line 706*e*. Segment 706*d* may be associated with a viewing angle of 324°-334° with respect to normal line 706*e*. These angles for the field of view could change, or be calculated, based on the orientation of the user's extended reality device 702 and its field of vision. For example, extended reality displays may be seen only within the extended reality display viewport, which may be very narrow for extended reality head-mounted displays. The field of view see-through portion of the extended reality display may be much greater than the extended reality device rendering viewport.

In some embodiments, depth perception may also be determined. For example, the extended reality device 702 may use an inward-facing camera to determine the focus of the user's eyeballs and whether they are looking at something near or far to determine what is in their line of sight.

In other embodiments, distance from the extended reality device to the display may be calculated based on coordinates of the extended reality device and the coordinates of the display. The depth perception of the user's gaze in conjunction with the coordinates of the displays may be used to determine which display is in the FOV and LOS. The distance between the extended reality device and the display may be a physical and/or spatial (virtual) distance.

In some embodiments, an application programming interface (API) may be utilized to enable the extended reality device 702 to identify, and control, content items playing on the different displays 708*a*, 708*b*, 708*c*, 708*d*, 708*e*, and 708*f*. Such an API may be provided via the device itself and/or via an application provider, such as an OTT service provider.

Figure 8:
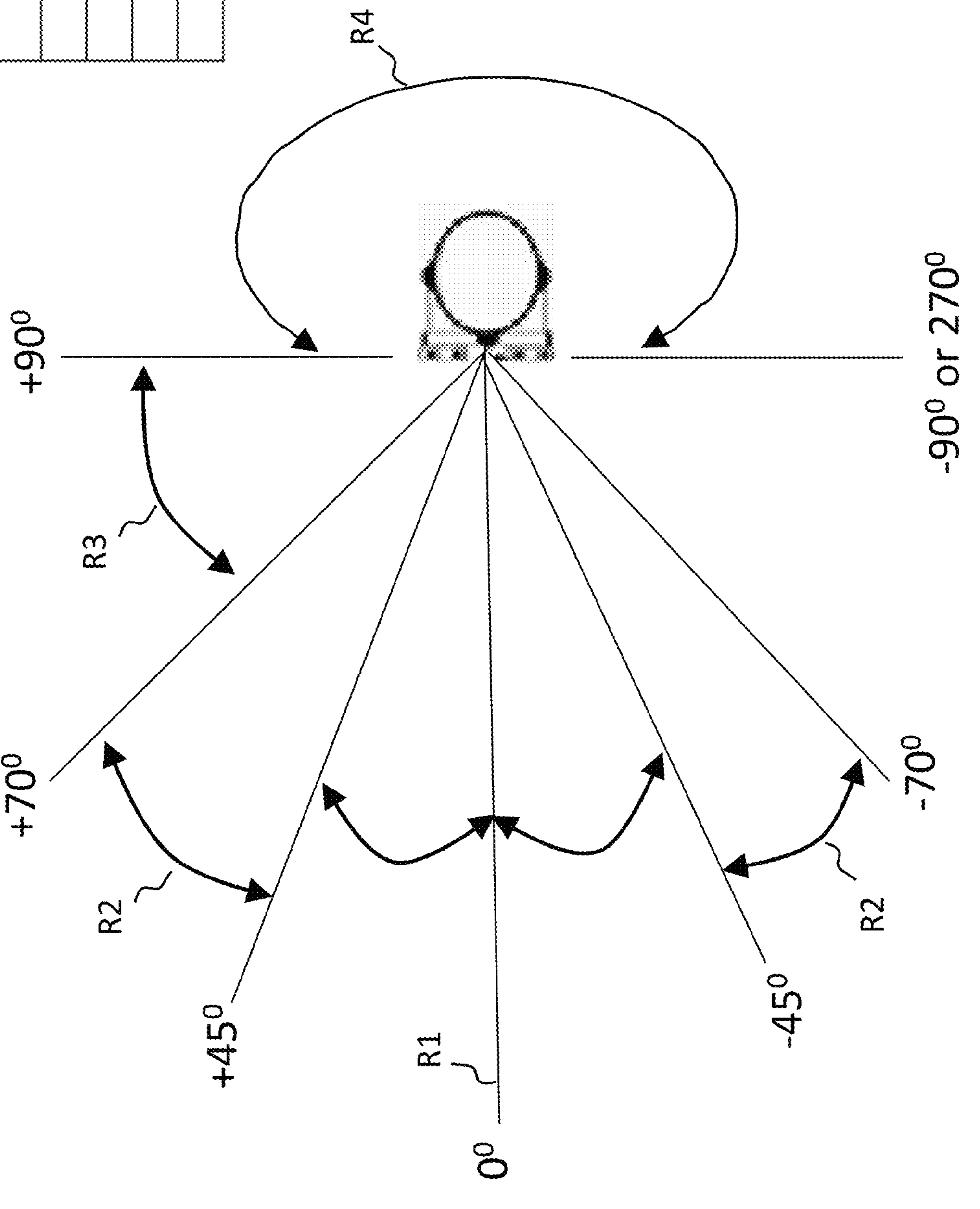
FIG. 8 is an example depicting different volume thresholds for different ranges of view from an extended reality device, in accordance with some embodiments of the disclosure.

FIG. 8 is an example of depicting different volume thresholds for different ranges of view from an extended reality device, in accordance with some embodiments of the disclosure.

In one embodiment, the control circuitry may divide the 360° circle around the extended reality device into a plurality of ranges. The ranges may represent the angles of sight from the extended reality device. The control circuitry may divide the 360° circle into any number of ranges desired. The number of ranges may also be determined based on user input.

In one embodiment, the direct line of sight, which is at a 0° angle from the extended reality device to 45° angle may be determined as Range 1. The control circuitry may determine that the extended reality device is in Range 1 based on the coordinates received from the extended reality device's IMU. The IMU may provide both transitional as well as orientational coordinates of the extended reality device. Based on the coordinates, the control circuitry may determine the FOV from the extended reality device. In this embodiment, the extended reality device is directly focused towards the 0° angle. If the control circuitry determines that a display is located either directly at the 0° angle or within the 45° angle from the extended reality device, then the control circuitry may determine a current volume of the display. If the current volume level is below volume level A, then the control circuitry will increase the volume until it reaches volume level A. If the current volume level is already at volume level A, then the control circuitry may either maintain the volume or provide an option to the user to increase it. In one embodiment, volume level A may be associated with a maximum AR virtual TV volume level, i.e., whatever the maximum volume level is allowed on the augmented reality TV.

In another embodiment, the control circuitry may associate an angle of sight between +460 to +70° with Range 2. The control circuitry may determine that, based on the current coordinates of the extended reality device, any objects or displays that are between a +46° to +70° angle from the extended reality device fall within Range 2.

In one embodiment, an augmented reality display may be located within Range 2. Upon determining that an augmented reality display is in Range 2, the control circuitry may modify the volume of the augmented reality display to volume level B. In one embodiment, volume level B may be calculated based on the following formula: Volume level=round (AR Virtual TV maximum×((Range 2 upper limit°−FOV°)/Range 2 upper limit°−Range 2 lower limit°)). The formula described may be one of several types of formulas that may be applied by the control circuitry to determine the volume change for an augmented reality device that is in Range 2.

In another embodiment, the control circuitry may associate an angle of sight between +71° to +90° with Range 3. The control circuitry may determine that, based on the current coordinates of the extended reality device, any objects or displays that are between a +71° to +90° angle from the extended reality device fall within Range 3.

In one embodiment, an augmented reality display may be located within Range 3. Upon determining that an augmented reality display is in Range 3, the control circuitry may modify the volume of the augmented reality display to volume level C. In one embodiment, volume level C may be associated by the control circuitry with muted volume or a minimum volume level. Since any displays in Range 3 are outside the FOV, which in this embodiment as an example is defined as between 71° and 90°, the control circuitry mutes the volume of such displays outside the FOV such that they do not cause noise for displays that are in the FOV and of current interest to the user. Although some ranges, their angles, and their volumes and exemplary formulas to calculate such volumes are described in relation to FIG. 8, the embodiments are not so limited and other ranges, angles, volumes, and formulas are also contemplated.

FIGS. 7 and 8 provide some embodiments in which displays are identified, and angles of displays from the extended reality device are determined. The angles are used to determine whether one or more displays are within an FOV of the extended reality device, and, if so, based on their angles in the FOV, a volume leveling, or volume adjustment, is performed. Such volume leveling between two or more displays that are in the FOV are performed such that the volume of a display that is being viewed by the user is enhanced, and volume of other displays is minimized or muted. The amount of minimization or muting depending on the angles from the extended reality device and other displays. The process results in reducing noise from other displays that may prevent the user from hearing content displayed on the display on which the user's gaze is focused.

In another embodiment, volume leveling happens in different ways depending on whether it is for the extended reality virtual TVs or physical TVs. For example, for physical TVs that are connected via Bluetooth, the TV speakers are used. If the TV is connected to an AV receiver, then the AV receiver is used.

For the extended reality virtual TVs, the overall headset volume level is used. Each extended reality TV will have its own volume level set. The volume level, however, can never exceed the highest volume level possible for the extended reality device. In some embodiments, at the application level, the volume is adjusted based on the APIs offered by an SDK like Unity™. The volume level will be dynamically adjusted, setting the levels through the SDK's API based on the user's orientation, also referred to as the user's pose. Depending on the range in which the point of reference of the spatial tag is located related to the user's pose, the volume level adjustment will be made based on the corresponding level for that range. Some examples of volume levels and associated ranges are depicted in the table of FIG. 8.

In some embodiments, when a Bluetooth connection is used, the volume leveling can happen in two ways. The first is through adjusting the Bluetooth volume level in the extended reality device through an API. The second is by adjusting the volume level of the physical TV, which will adjust the Bluetooth output volume level of the speaker associated with the extended reality device.

In some embodiments, if the Bluetooth headset is controlled by the TV volume, the physical TV volume level is used. When the Bluetooth extended reality device volume is used, the Bluetooth volume level will not exceed the initial Bluetooth volume level when initially starting the extended reality display system unless the user decides to manually change the volume level while running the system.

In some embodiments, when initially starting the system, the Bluetooth volume level will be retrieved leveraging an API and saved. Anytime the user manually changes the Bluetooth volume level, the new Bluetooth volume level will be saved. Only adjustments using the saved Bluetooth volume level will be made where the maximum volume adjustment is saved as the volume level.

In some embodiments, when exiting the system, the Bluetooth volume level will be reset to the saved volume level. The extended reality device Bluetooth volume range must be retrieved from the extended reality device, such as a mobile device, that provides the processing for the headset display. Since different extended reality devices have different volume scales, each device's volume scale may be determined and used. For example, some devices may have a volume scale of 1-10 while others may have a volume scale of 1-100. It is expected that these scales can be retrieved by a device level API.

Figure 9:
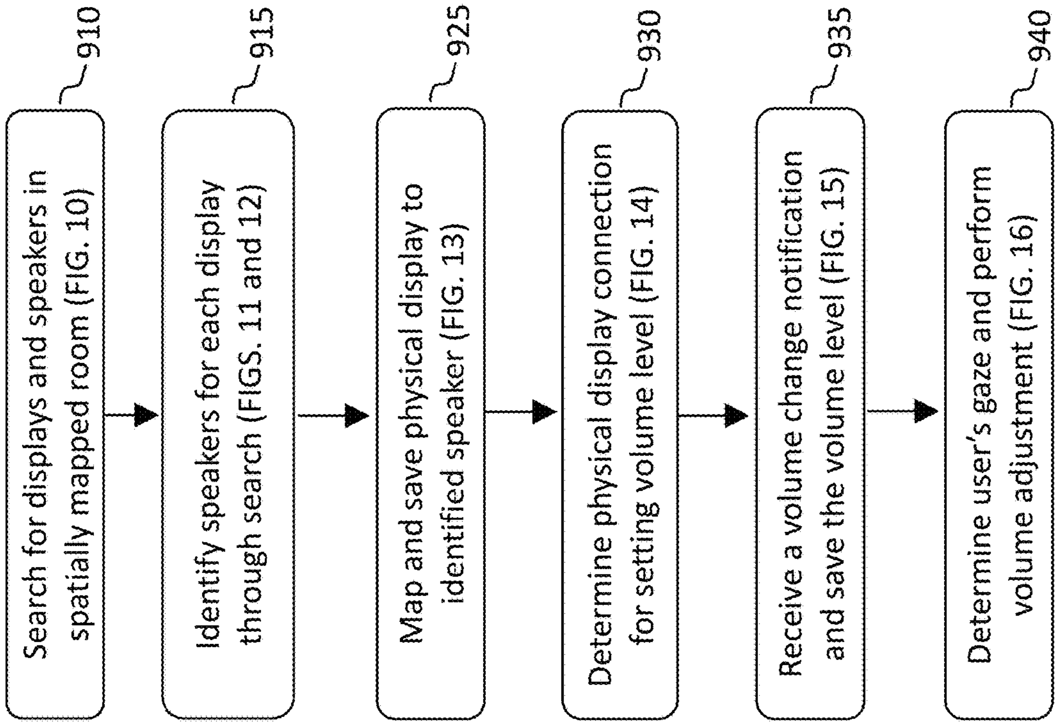
FIG. 9 is flowchart of a process for discovering physical displays in a spatially mapped room and adjusting their volume via the extended reality device, in accordance with some embodiments of the disclosure.

FIG. 9 is flowchart of a process for discovering physical displays in a spatially mapped room and adjusting their volume via the extended reality device, in accordance with some embodiments of the disclosure.

In one embodiment, at block 910, the control circuitry may conduct a search for displays and speakers in the spatially mapped room. The control circuitry may determine which physical speakers are already mapped to the physical displays and which speakers and displays are still to be mapped. The process of such mapping between physical speakers and physical displays is described in more detail in FIG. 10.

Figure 10:
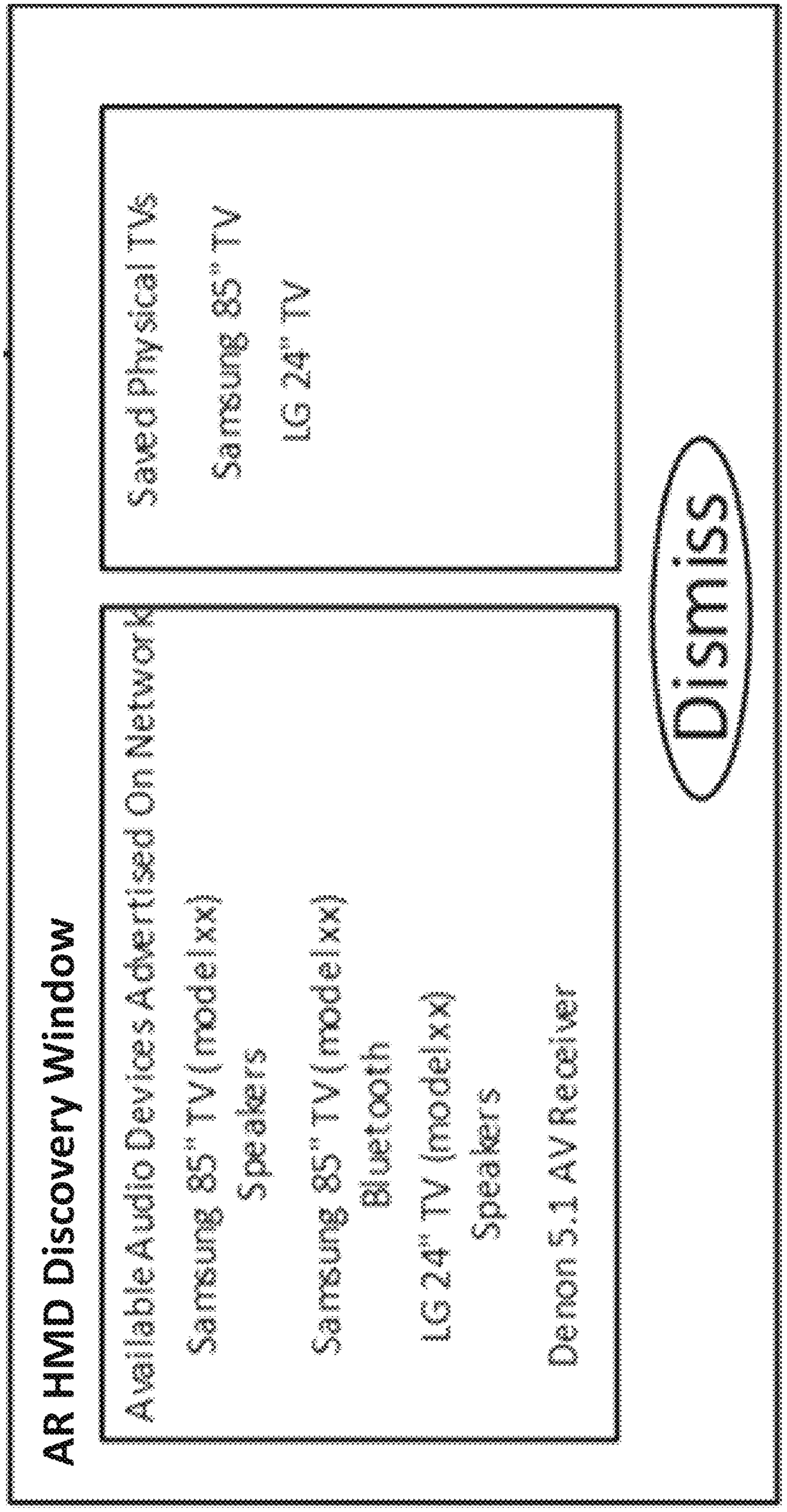
FIG. 10 is a block diagram of an initial network discovery window, in accordance with some embodiments of the disclosure.
Figure 11:
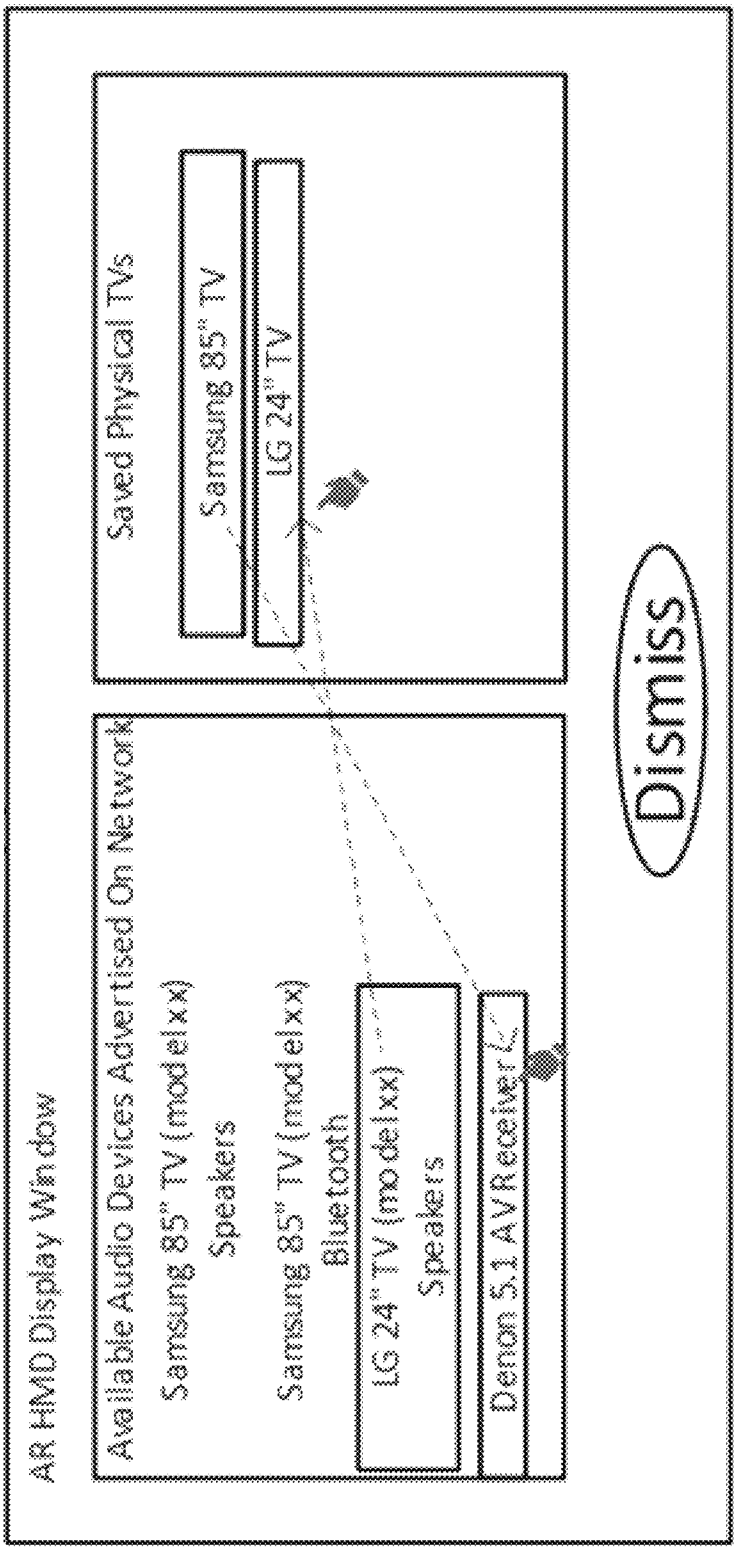
FIG. 11 is a block diagram of associating a speaker with a display that is located in the spatially mapped room, in accordance with some embodiments of the disclosure.

FIG. 10 is a block diagram of an initial network discovery window, in accordance with some embodiments of the disclosure. In some embodiments, the initial network discovery window may be displayed within a display of the extended reality device. As depicted in FIG. 10, the left side of the window includes a list of all the speakers that are available in the spatially mapped room, and the right side of the window includes all the physical displays. As depicted in FIG. 11, the discovery window may display (not shown) a mapping of the physical audio devices that offer an API for volume control to already identified and saved TVs within the spatially mapped room. As shown in FIG. 11, the discovery window may also display physical audio devices and TVs that have not yet been mapped to each other.

The audio devices may include a remote-control functionality that can be used to send discovery messages over the Wi-Fi network so they can be discovered by the extended reality device. In some embodiments, a user wearing the extended reality device may perform gestures that can be used by the control circuitry to perform a mapping of a specific speaker to a display.

Referring back to FIG. 9, at block 915, once all the physical speakers and physical displays in the spatially mapped room are identified, the control circuitry may map a specific physical speaker to a specific physical display. The process is described in more detail in FIGS. 11-13. In one embodiment, FIG. 11 depicts a block diagram of associating a speaker with a display that is located in the spatially mapped room.

As depicted in FIG. 11, in one embodiment, the control circuitry maps LG 24" TV (model xx) speakers, which are physical speakers, to LG 24" TV, which is a physical TV having a physical display. In one embodiment, the LG 24" TV (model xx) speakers and the LG 24" TV may be a same device or housing within which the display and the speakers are housed.

In another embodiment, the control circuitry maps Denon 5.1 AV receiver to Samsung 85" TV. In this embodiment, the speakers may be external to the physical TV. Control circuitry may select any speaker that is compatible for mapping to a physical display: it is not restricted to using only those speakers that are part of the same TV housing.

Figure 12:
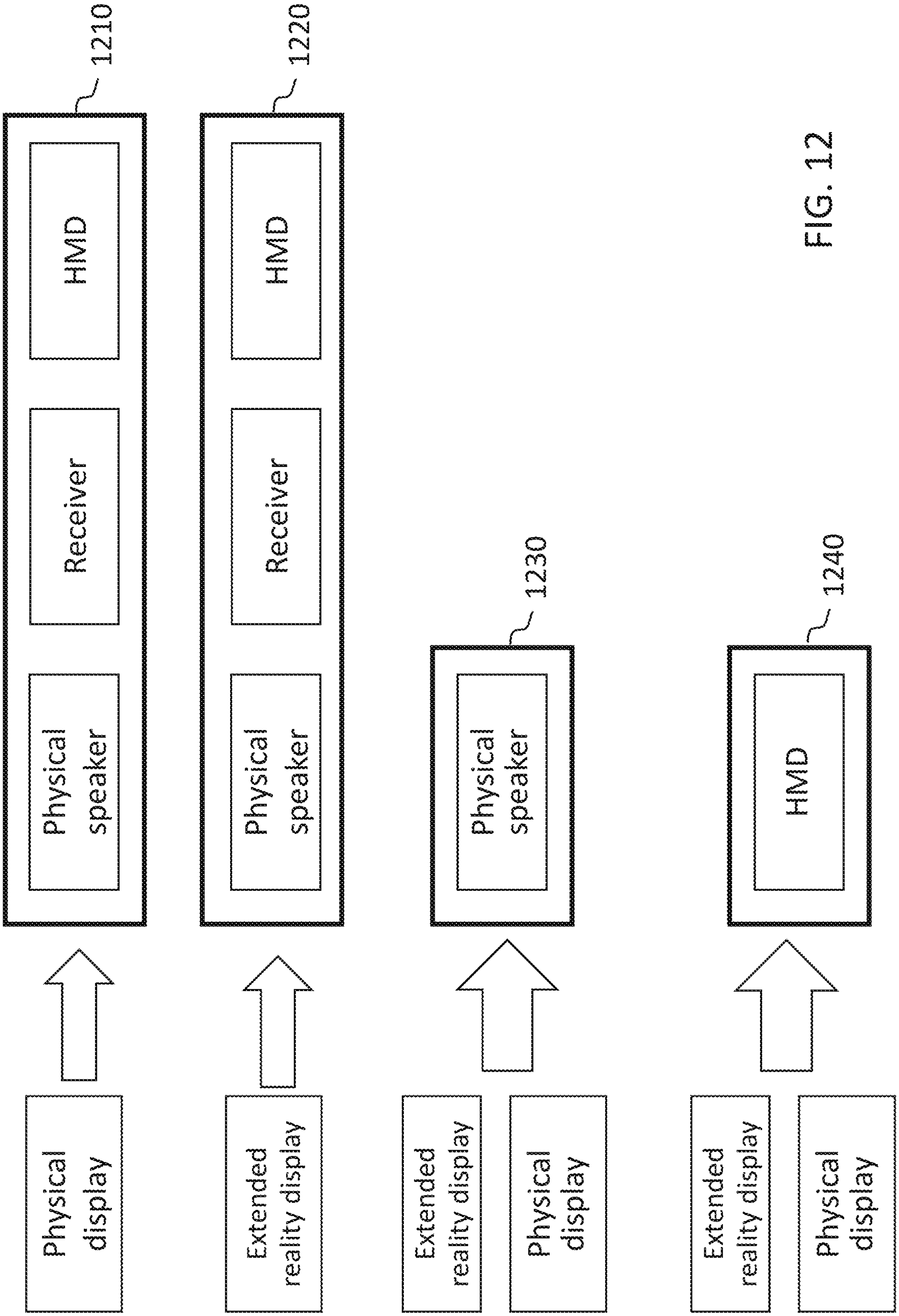
FIG. 12 is a block diagram of different speakers associated with different displays, in accordance with some embodiments of the disclosure.

As depicted in FIG. 12, a plurality of speaker and display mapping possibilities may be performed by the control circuitry. In one embodiment, as depicted at block 1210, the control circuitry may map a physical display to any one of a physical speaker, a receiver, or a Bluetooth speaker that is associated with the extended reality head-mounted display. The volume of the speaker to which it is mapped may be controlled either via the physical display or directly through the volume controls offered by the speaker itself. The volume level may be determined based on the gaze of the user towards the physical display and the angle of the gaze. For example, a direct gaze towards the physical display, such as at a 0° angle or within a 15° or 45° angle, may be associated with a highest range and the highest volume, or the preferred volume from the user profile may be used to set the speaker volume. In other examples, if the physical display is at a farther angle from the extended reality device, such as the examples of Ranges 2-4 in FIG. 8, then a lower volume, a formula for the volume, or mute option may be selected by the control circuitry for the physical display.

In another embodiment, as depicted at block 1220, the control circuitry may map an extended reality display to any one of a physical speaker or speakers, a receiver, a Bluetooth speaker that is associated with the extended reality head-mounted display, or earbuds or headphones that include a wireless or wired connection. The volume of the speaker to which the extended reality display is mapped may be controlled either via the speaker in the extended reality device or directly through the volume controls offered by the speaker itself. The volume level may be determined based on the gaze of the user towards the extended reality display and the angle of the gaze. For example, a direct gaze towards the extended reality display, such as at a 0° angle or within a 15° or 45° angle, may be associated with a highest range and the highest volume, or the preferred volume from the user profile may be used to set the speaker volume. In other examples, if the extended reality display is at a farther angle from the extended reality device, such as the examples of Ranges 2-4 in FIG. 8, then a lower volume, a formula for the volume, or mute option may be selected by the control circuitry for the display.

In some embodiments, the control circuitry, as depicted at block 1230, may map both a physical display and an extended reality display to the same physical speaker. In yet other embodiments, the control circuitry, as depicted at block 1240, may map both a physical display and an extended reality display to the same extended reality speaker. The control circuitry may also map all the physical displays and all the extended reality displays in the spatially mapped room to a single speaker, such that the same single speaker's volume can be switched from content playing on one display to content playing on another display based on the user's gaze.

Referring back to FIG. 9, at block 925, the mapping of the speakers to the displays may be saved. The process of mapping the speaker and associating it to a physical display, in accordance with some embodiments, is described in the flowchart of FIG. 13.

Figure 13:
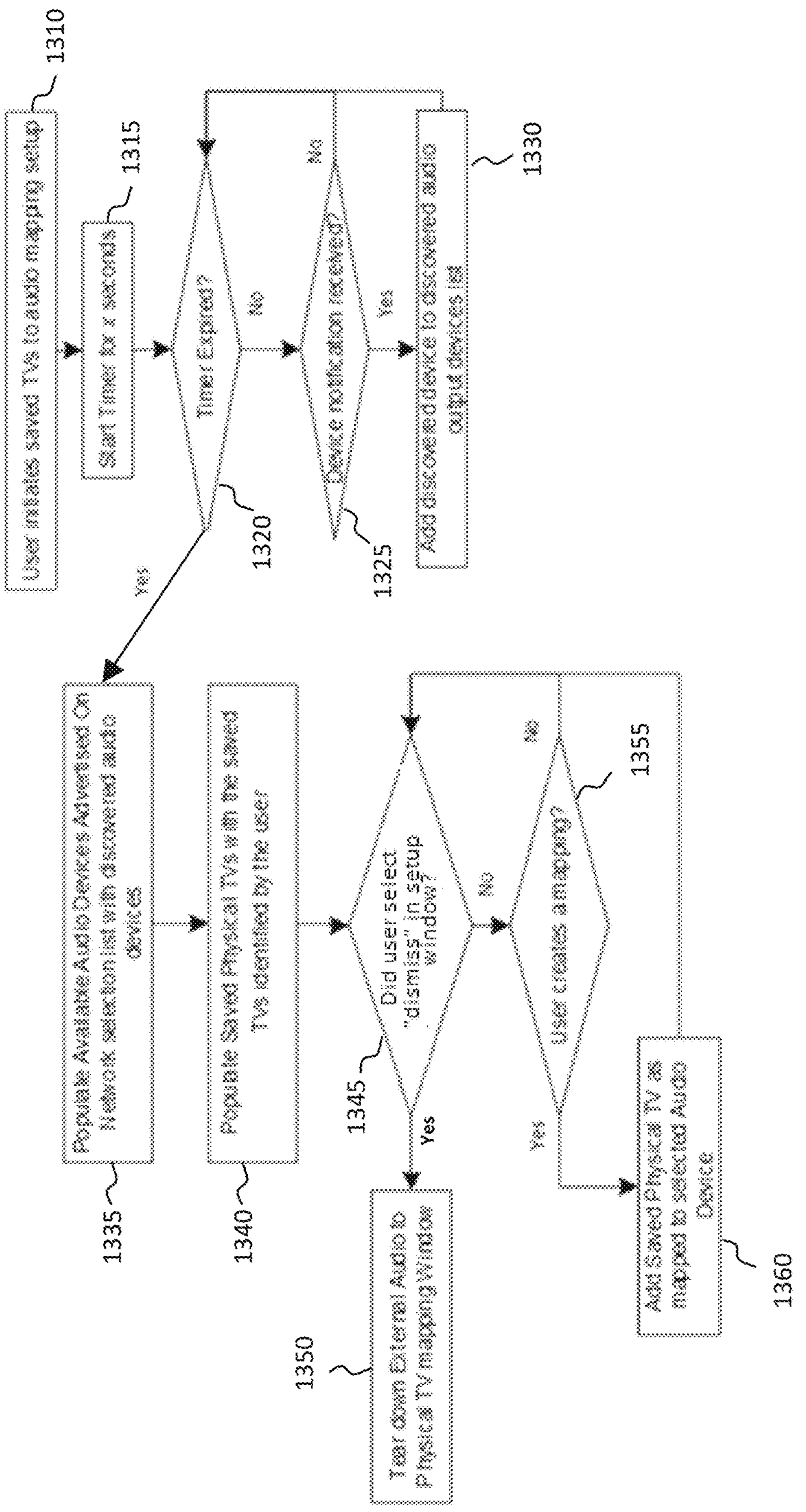
FIG. 13 is flowchart of a process for mapping and saving a speaker to a display that is located in the spatially mapped room, in accordance with some embodiments of the disclosure.

At block 1310 of FIG. 13, in some embodiments, a user may initiate a process for mapping a saved TV display to an audio speaker. Information identifying the physical TV and its location in the spatially mapped room may be saved by the control circuitry in a database. The information may include the type and brand of the TV, its volume outputs, and the type of physical display associated with the TV. The location may be its transitional and orientational coordinates with respect to an origin or reference point in the spatially mapped room or to an object, reference point, or origin in the real or virtual world.

At block 1315, the control circuitry may start a timer for X number of seconds, such as five seconds, or any other predetermined amount of time. The control circuitry may use the time allotted by the timer to search for all the physical speakers that are available in the spatially mapped room.

At block 1320, a determination may be made whether the timer has expired. If a determination is made by the control circuitry that the timer has not expired, then the process moves to block 1325, where the control circuitry determines whether a device notification is received. This device notification relates to a notification that a speaker has been identified and includes speaker information. A device notification may be received by the control circuitry if a speaker is detected in the spatially mapped room. The notification may be received in response to the querying or sending of a ping signal by the control circuitry. In response to such query or ping signal, a speaker in the spatially mapped room may respond with a notification that it is available.

If, at block 1325, a determination is made by the control circuitry that the device notification has not been received, then the process moves back to block 1320, where a new timer may be started, and another search may be performed to detect a speaker. If, at block 1325, the control circuitry determines that a notification that a speaker is available has been received, then, at block 1330, the available speaker is added to an output device list for the physical display. The process may continue and perform a certain number of feedback loops between blocks 1330 and 1320 (not shown in figure) such that other speakers in the spatially mapped room may also be discovered and added to the output device list.

Once the loop is performed for a predetermined number of iterations (not shown in figure) or until at least one speaker is identified and added to the output list, the process moves to block 1335. In one embodiment, a counter may be used to keep count of the number of iterations of the process from blocks 1320 to 1330 is performed. Once the counter reaches a predetermined count limit, then the process may move to block 1335.

At block 1335, the control circuitry may populate all the available audio devices advertised on the network selection list with discovered audio devices. In other words, control circuitry may generate a comprehensive list of all the audio devices/speaker in the spatially mapped room, i.e., both audio devices discovered through process 1320-1330 as well as other audio devices that were advertised on the network if not already found through the discovery process.

At block 1340, the saved physical TVs are populated with TVs identified by the user. For example, the physical TVs may be populated in a TV list. The TV list may be used to display information such as which TV is mapped to which audio output device At block 1345, a determination is made whether the user has selected "dismiss" in the setup window. The window referred to is depicted in FIG. 11. In response to a determination that a user has selected the dismiss option in the setup window, the control circuitry tears down, i.e., closes, the window depicted in FIG. 11. In response to a determination that a user has not selected the dismiss option in the setup window, the control circuitry (or user), at block 1355, creates a mapping and adds the saved physical TV as mapped to the selected audio device(s) at block 1360.

Referring back to FIG. 9, at block 930, the control circuitry determines the type of connection used for the TV to determine where to retrieve the current volume and save it as the volume level for the TV.

Figure 14:
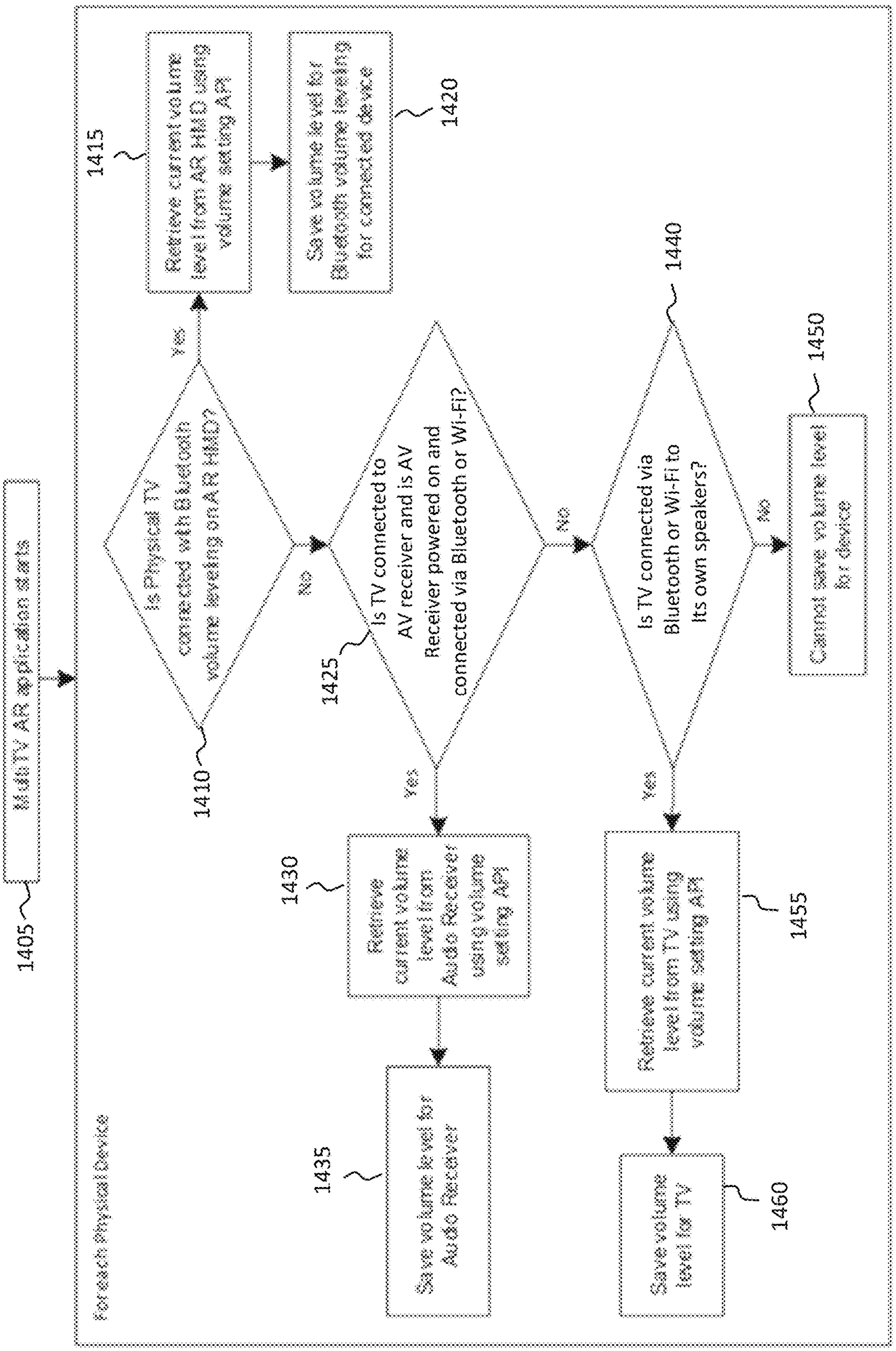
FIG. 14 is flowchart of a process for saving volume setting for a physical display located in the spatially mapped room, in accordance with some embodiments of the disclosure.

In one embodiment, at block 1405 of FIG. 14, the control circuitry starts a multi-TV application to determine the type of connection for the TV. For example, these connections can be the physical TV connected a) via Bluetooth to the extended reality device (e.g., an ARD), b) via Bluetooth or Wi-Fi to a receiver, or c) via Bluetooth, Wi-Fi, or circuitry to its own speakers.

In one embodiment, at block 1410, the control circuitry determines whether the physical TV is connected via Bluetooth to the extended reality device (such as an AR HMD as referred to in the FIG. 14). If a determination is made, at block 1410, that it is connected via Bluetooth to the extended reality device, then, at block 1415, the control circuitry retrieves the current volume from the extended reality device using the volume setting API and saves the volume level such that it can be used as the volume level when the user's gaze is directed towards the TV.

If a determination is made at block 1410 that the physical TV is not connected via Bluetooth to the extended reality device, then at block 1425 the control circuitry determines whether the physical TV is connected to an AV receiver that is powered on and connected via Bluetooth or Wi-Fi connection. If a determination is made at block 1425 that the physical TV is connected to the AV receiver, then the control circuitry retrieves the current volume from the receiver via an API and saves the volume level such that it can be used as the volume level when the user's gaze is directed towards the TV.

If a determination is made at block 1425 that the physical TV is not connected via Bluetooth of Wi-Fi to a receiver, then, at block 1440, the control circuitry determines whether the physical TV is connected via Bluetooth, Wi-Fi, or circuitry to its own speakers. If a determination is made at block 1440 that the physical TV is connected to its own speakers, then the control circuitry retrieves the current volume from the TV and saves the volume level such that it can be used as the volume level when the user's gaze is directed towards the TV.

If a determination is made at block 1440 that the physical TV is not connected to its own speakers, then, in one embodiment, since it is not connected to any speakers (as discovered in decision blocks 1410, 1425, and 1440), the volume level cannot be saved.

Referring back to FIG. 9, at block 935, the control circuitry determines if a notification that indicates that a volume level has been changed is received. As described in FIG. 14, the current volume level was obtained from a device connected to the physical TV display, and the current volume was saved such that it can be used later when either starting up the physical TV or when a user's gaze is directed towards the physical TV. Once the current volume is saved, a determination is made if the volume is changed from the current level. In one embodiment, determining if the volume level changed is described in connection with FIG. 15.

Figure 15:
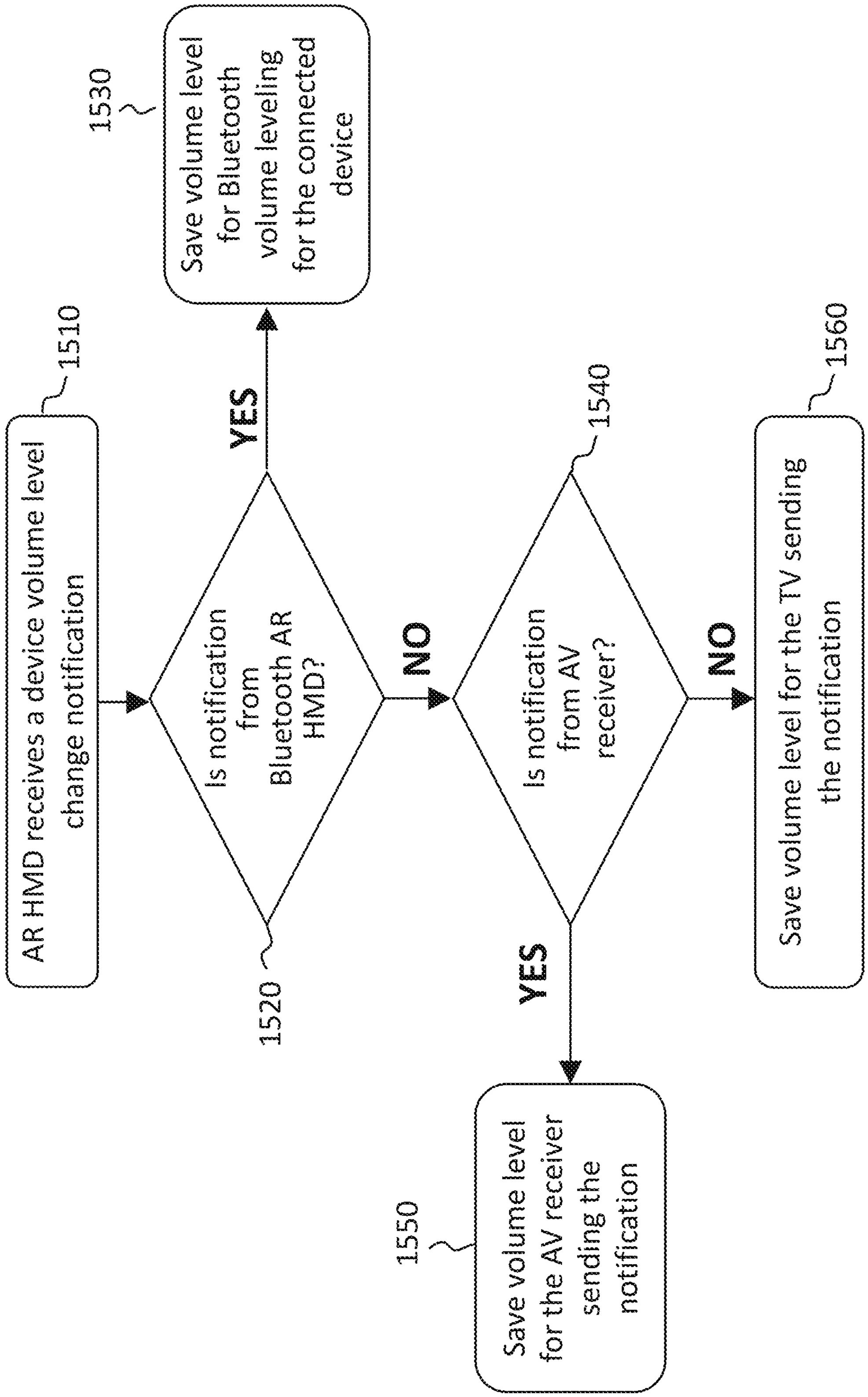
FIG. 15 is flowchart of a process for saving volume setting for a physical display on the physical device, in accordance with some embodiments of the disclosure.

In FIG. 15, at block 1510, in one embodiment, the extended reality device (in this example, an AR HMD) receives a notification that a volume level has been changed. In response to the notification, the control circuitry, at block 1520, determines if the notification is received from the AR HMD's Bluetooth connection. If the notification is received from a Bluetooth connection, at block 1530, the control circuitry saves the changed volume level as the volume level for the connected device.

If a determination is made at block 1520 that the notification received is not from the Bluetooth of the AR HMD, then the control circuitry determines if the notification is received from an AV receiver. In response to determining that the notification is received from an AV receiver, the control circuitry saves the changed volume level as the current volume level for the AV receiver such that it can be used when the system restarts or when the user's gaze is directed upon the display that is associated with the AV receiver.

If a determination is made at block 1540 that the notification is not received from an AR receiver, then the control circuitry determines that such a notification may be received from the TV itself. In this scenario, the control circuitry saves the changed volume as the current volume for the TV. The process of blocks 1510-1560 saves the updated volume as the current volume. The updated volume is a change in volume that may have been performed by the user, such as the user increasing or decreasing the volume by gesturing when wearing the headset or by using a remote device. The change in volume may also occur based on volume changes performed by the control circuitry.

Referring back to FIG. 9, at block 940, the control circuitry determines the user's gaze and, based on the direction of the gaze, modifies the volume of the displays. The process of determining the user's gaze and using the angle of the gaze to modify the volume of the display is described in further detail in FIG. 16.

Figure 16:
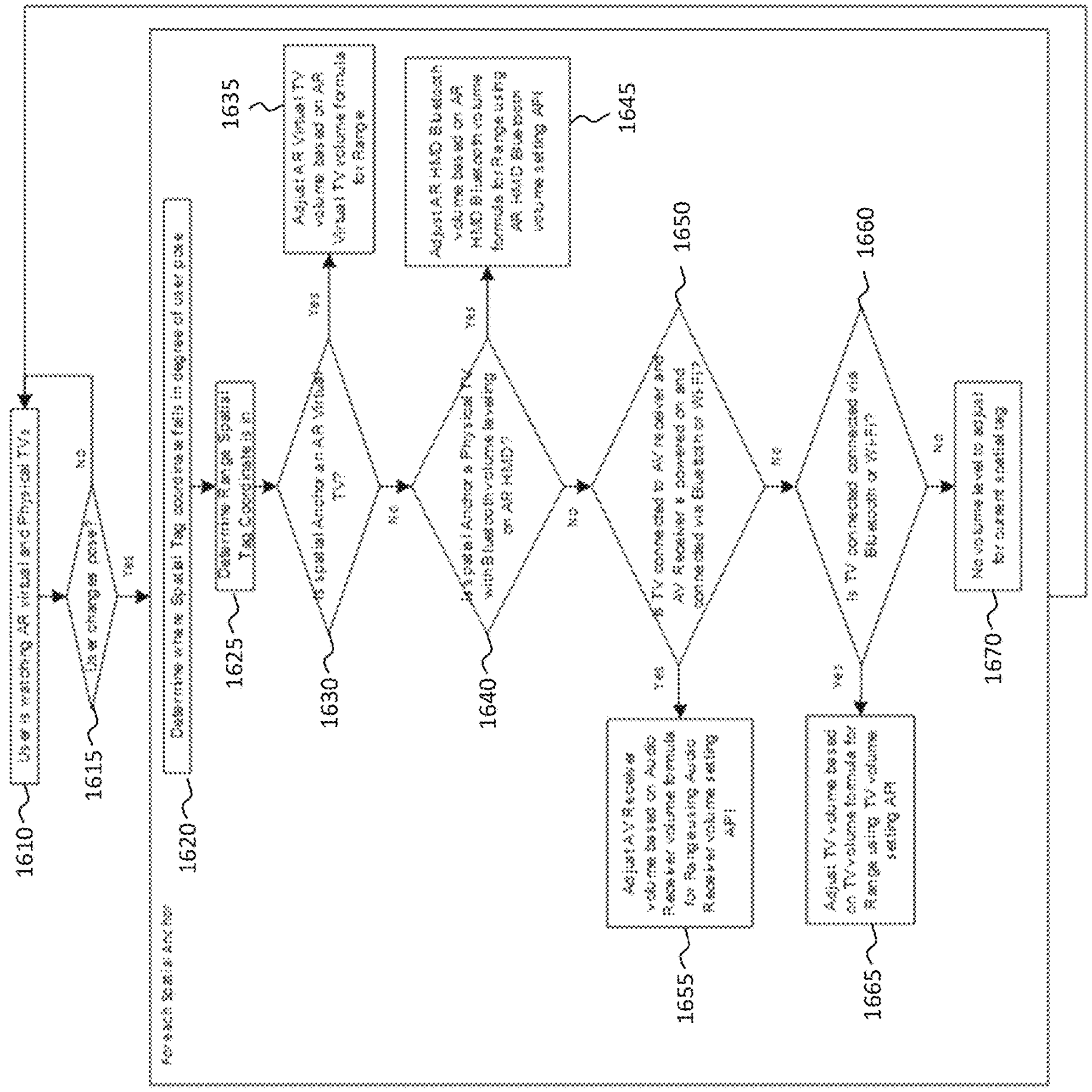
FIG. 16 is flowchart of a process for adjusting volume of physical display located in the spatially mapped room via an extended reality device, in accordance with some embodiments of the disclosure.

In FIG. 16, at block 1610, in one embodiment, a user may be consuming content on either an extended reality display or a physical display while wearing an extended reality device.

At block 1615, the control circuitry may detect whether the user has changed their pose. For example, it may determine whether the user wearing the headset may have turned their head to the left from the head's current position or oriented their headset at a different angle by tilting their head. In response to determining that the user has not changed their pose from their current position, the control circuitry may continue to monitor the user until a change in pose is detected.

In one embodiment, the control circuitry may determine that the user has changed their pose. The control circuitry may make such a determination based on data provided by the IMU, such as the gyroscope associated with the IMU. The IMU data may be used to determine that the user has moved, thereby displacing their headset in a transitional or orientational manner. The control circuitry may also use other methods for detecting that the user has moved their headset from one location to another location. For example, other methods of detecting may include obtaining data from motion sensors coupled to the headset or to the user or detecting a change of scenery from an outward-facing camera of the extended reality device.

In response to determining that the user has changed their pose from their current pose, the control circuitry determines the FOV from the user's new pose, i.e., the pose after the user has moved their head to a new location.

At block 1620, the control circuitry may also determine spatial tag coordinates of displays, whether physical displays or extended reality displays, that are located in the spatially mapped room. The control circuitry may determine, based on the coordinates of the current pose of the user, whether any of the special tags of a display are within the FOV of the extended reality device worn by the user.

At block 1625, the control circuitry may associate a spatial tag of the display with a particular volume range. The volume range may depend on the angle of view from the extended reality device. Some examples of ranges and their association to angles of view are depicted in FIG. 8. For example, a first range may be associated with angles between 0° and 45° angle from the extended reality device, and a second range may be associated with angles between 45° and 70° angle from the extended reality device.

At block 1630, the control circuitry may determine whether the spatial anchor is related to an extended reality display (such as an AR virtual TV). In response to determining that the spatial anchor is for an extended reality display, the control circuitry, at block 1635, may adjust the volume of the extended reality display. The volume adjustment may be performed based on the angle of gaze between the extended reality device and the extended reality display. For example, if user's gaze is directly focused on the extended reality display, such as at a 0° or less than 45° angle, then a range may be associated with the angle of gaze, and the volume may be adjusted to a highest volume, preferred volume from the user profile, or volume from last volume setting.

If a determination is made at block 1630 that the spatial anchor is not related to the extended reality display, then, at block 1640, the control circuitry may determine whether the spatial anchor is related to a physical display. For example, the control circuitry may determine that the physical display is at an angle of sight between 45° to 70° with respect to the extended reality device. Accordingly, the control circuitry may associate the angles with Range 2. The control circuitry may then determine the volume of the physical display based on the following formula: Volume level=round (AR Virtual TV maximum×((Range 2 upper limit°−FOV°)/Range 2 upper limit°−Range 2 lower limit°)). The formula described, the angles, and the associated ranges are provided as an example and other angles, their association to ranges, and formulas may also be used to determine the volume of the physical display. The control circuitry, at block 1645, may apply the volume level determined based on the range such that the content displayed on the physical device has the volume outputted into the extended reality device via Bluetooth at a volume level that is associated with the determined range.

If a determination is made at block 1640 that the spatial anchor is not related to the physical display, then, at block 1650, the control circuitry may determine whether the physical display (TV) is connected to the AV receiver and whether the AV receiver is powered on and connected via Bluetooth or Wi-Fi. In response to determining that the physical display (TV) is connected to AV receiver and that the AV receiver is powered on and connected via Bluetooth or Wi-Fi, the control circuitry, at block 1655, may adjust the AV receiver's volume based on the user's gaze and the range associated with the user's gaze.

If a determination is made at block 1650 that the physical display is not connected to AV receiver or that the AV receiver is powered off or not connected via Bluetooth or Wi-Fi, then, at block 1660, the control circuitry may determine whether the physical display is connected to its own speakers via Bluetooth, Wi-Fi, or circuitry. If a determination is made that physical display is connected to its own speakers, then the control circuitry, at block 1665, may adjust the TV volume based on the user's gaze and the range associated with the user's gaze.

If a determination is made that the physical display is not connected to the TV speaker, or any other type of audio output as mentioned in blocks 1630-1650, then, at block 1670, no volume adjustment may be performed. The process may be repeated in some embodiments for a predetermined number of times or until a volume adjustment has been performed. The process may also be continuously repeated if the user continues to change their location of the headset to watch different displays, such as by trying to go back and forth and watch different content on different displays. The process may then result in continuously enhancing a volume of a display on which the user's gaze is directed and minimizing or muting the volume of other displays that are outside the user's FOV based on the formulas and volume adjustments discussed above.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
- detecting, by an extended reality (XR) headset device, a plurality of display devices for displaying content, wherein at least one display device of the plurality of display devices is a physical display device and at least one display device of the plurality of display devices is a virtual display device;
- monitoring a gaze of a user wearing the XR headset device;

and
- adjusting volume of the content outputted on a display device of the plurality of display devices, from the plurality of display devices, towards which the gaze is directed, wherein the adjusting comprises:
  - determining, by the XR headset device, an angular position of a gaze direction associated with the gaze of the user;
  - determining, by the XR headset device, an angular position of the display device relative to the gaze direction;
  - comparing the angular position of the display device with a plurality of threshold angular positions;
  - based on the comparing, determining a volume level associated with the angular position of the display device;
  - adjusting the volume of the content outputted on the display device based at least in part on the volume level associated with the content; and
  - decreasing a second volume corresponding to a second content associated with a second display device, wherein the second display device is from the plurality of display devices and the second display device is different from the display device.

2. The method of claim 1, wherein the XR headset device is a virtual reality headset or a pair of smart glasses having an optical or video see-through functionality.

3. The method of claim 1, wherein determining whether the gaze is directed towards the display device, from the plurality of display devices, further comprises:
- obtaining a current orientation of the XR headset device;
- determining the gaze based on the current orientation; and
- determining whether the display device, from the plurality of display devices, is within the plurality of threshold angular positions of the determined gaze.

4. The method of claim 3, wherein the plurality of threshold angular positions includes a first threshold and a second threshold, where the first threshold is associated with a first field of view between a first angle and a second angle, and the second threshold is associated with a second field of view between the second angle and a third angle.

5. The method of claim 4, further comprising adjusting the volume for the content displayed on the display device to a first volume level in response to a determination that the gaze is within the first threshold.

6. The method of claim 4, further comprising adjusting the volume for the content displayed on the display device to a second volume level in response to a determination that the gaze is within the second threshold, wherein a volume level for the first threshold is higher than a volume level for the second threshold.

7. The method of claim 1, wherein monitoring the gaze of the user comprises:
- accessing an inward-facing camera of the XR headset device; and
- monitoring the user's eye movement to determine the gaze of the user's eyes.

8. The method of claim 1, further comprising associating each display device, from the plurality of display devices, with an audio device.

9. The method of claim 1, wherein the plurality of display devices further comprises one or more virtual display devices.

10. The method of claim 9, further comprising:
- determining whether the gaze is directed towards the physical display device or the virtual display device; and
- adjusting the volume for the content displayed on either the physical display device or the virtual display device based on which display device the user's gaze is directed towards.

11. The method of claim 9, further comprising:
- based on monitoring the gaze of the user, determining that the gaze has shifted from the physical display device to the virtual display device; and
- based at least in part on the determination:
  - lowering the volume for the content displayed on the physical display device; and
  - increasing the volume for the content displayed on the virtual display device.

12. A system comprising:
- control circuitry configured to:
  - detect a plurality of display devices for displaying content, wherein at least one display device of the plurality of display devices is a physical display device and at least one display device of the plurality of display devices is a virtual display device;
  - monitor a gaze of a user wearing the XR headset device; and
  - adjust volume of the content outputted on a display device, from the plurality of display devices, towards which the gaze is directed, wherein the adjusting comprises:
    - determining, by the XR headset device, an angular position of a gaze direction associated with the gaze of the user;
    - determining, by the XR headset device, an angular position of the display device relative to the gaze direction;

comparing the angular position of the display device with a plurality of threshold angular positions;

based on the comparing, determining a volume level associated with the angular position of the display device;

adjusting the volume of the content outputted on the display device based at least in part on the volume level associated with the content; and decreasing a second volume corresponding to a second content associated with a second display device, wherein the second display device is from the plurality of display devices and the second display device is different from the display device.

13. The system of claim 12, wherein the XR headset device is a virtual reality headset, or a pair of smart glasses having an optical or video see-through functionality.

14. The system of claim 12, wherein determining whether the gaze is directed towards a display device, from the plurality of display devices, further comprises, the control circuitry configured to:

obtain a current orientation of the XR headset device;

determine the gaze based on the current orientation; and determine whether the display device, from the plurality of display devices, is within a plurality of threshold angular positions of the determined gaze.

15. The system of claim 14, wherein the plurality of threshold angular positions includes a first threshold and a second threshold, where the first threshold is associated with a first field of view between a first angle and a second angle, and the second threshold is associated with a second field of view between the second angle and a third angle.

16. The system of claim 15, further comprising, the control circuitry configured to adjust the volume for the content displayed on the display device to a first volume level in response to a determination that the gaze is within the first threshold.

17. The system of claim 15, further comprising, the control circuitry configured to adjust the volume for the content displayed on the display device to a second volume level in response to a determination that the gaze is within the second threshold, wherein a volume level for the first threshold is higher than a volume level for the second threshold.

18. The system of claim 12, wherein monitoring the gaze of the user comprises, the control circuitry configured to:

access an inward-facing camera of the XR headset device; and monitor the user's eye movement to determine the gaze of the user's eyes.

19. The system of claim 12, further comprising, the control circuitry configured to associate each display device, from the plurality of display devices, with an audio device.

20. The system of claim 12, further comprising, one or more virtual reality display devices.

21. The system of claim 20, further comprising, the control circuitry configured to:

determine whether the gaze is directed towards the physical display device or the virtual display device; and adjust the volume for the content displayed on either the physical display device or the virtual display device based on which display device the user's gaze is directed towards.

22. The system of claim 20, further comprising, the control circuitry configured to:

based on monitoring the gaze of the user, determine that the gaze has shifted from the physical display device to the virtual display device; and in response to the determination:

lower the volume for the content displayed on the physical display device; and increase the volume for the content displayed on the virtual display device.

* * * * *